United States Patent
Premakumari et al.

(10) Patent No.: US 11,378,488 B2
(45) Date of Patent: Jul. 5, 2022

(54) SYSTEM AND METHOD FOR OPTIMIZING PASSIVE CONTROL STRATEGIES OF OSCILLATORY INSTABILITIES IN TURBULENT SYSTEMS USING FINITE-TIME LYAPUNOV EXPONENTS

(71) Applicant: INDIAN INSTITUTE OF TECHNOLOGY MADRAS (IIT Madras), Chennai (IN)

(72) Inventors: Premchand Chandramouly Premakumari, Mumbai (IN); Vineeth Nair, Mumbai (IN); Sujith Raman Pillai Indusekharan Nair, Chennai (IN); Nitin Babu George, Chennai (IN); Manikandan Raghunathan, Chennai (IN); Vishnu Rajasekharan Unni, Chennai (IN)

(73) Assignee: INDIAN INSTITUTE OF TECHNOLOGY MADRAS (IIT Madras), Chennai (IN)

( * ) Notice: Subject to any disclaimer, the term of this patent is extended or adjusted under 35 U.S.C. 154(b) by 224 days.

(21) Appl. No.: 16/894,052

(22) Filed: Jun. 5, 2020

(65) Prior Publication Data
US 2020/0386652 A1 Dec. 10, 2020

(51) Int. Cl.
*G01M 9/06* (2006.01)
*G01P 5/00* (2006.01)

(52) U.S. Cl.
CPC ............... *G01M 9/067* (2013.01); *G01P 5/00* (2013.01); *G01P 5/001* (2013.01)

(58) Field of Classification Search
CPC .......... G01P 13/02; G01P 13/025; G01P 5/02; G01P 5/06; G01P 5/07; G01P 5/00; G01P 5/04; G01P 5/14; G01P 5/12; G01P 5/165; G01P 13/0013; G01P 13/002; G01P 13/045; G01P 5/16; G01P 13/006; G01P 13/0066; G01P 13/0073; G01P 21/025; G01P 5/20; G01P 13/00; G01P 13/0006; G01P 13/0033; G01P 5/26; G01P 5/005; G01P 1/08; G01P 13/0046; G01P 13/0093; G01P 13/04;
(Continued)

(56) References Cited

U.S. PATENT DOCUMENTS 9,804,054 B2 * 10/2017 Vinod ................. G01M 13/028
10,337,414 B2 * 7/2019 Murugesan ........ G05B 23/0221
(Continued)

*Primary Examiner* — Andre J Allen
(74) *Attorney, Agent, or Firm* — Convergence Intellectual Property Law P.C.; Jonathan Garfinkel

(57) ABSTRACT

A system and method for optimizing passive control strategies of oscillatory instabilities in turbulent systems using finite-time Lyapunov exponents are disclosed. The method includes receiving data from one or more measuring devices connected to the turbulent flow system incorporating a control strategy in the flow field. One or more flow characteristics are determined from the data obtained from the measuring devices. The method involves computing critical dynamics from backward time finite-time Lyapunov exponent (FTLE) field based on the one or more flow characteristics. Next, one or more regions of critical dynamics associated with impending oscillatory instabilities in the turbulent flow system are identified. The identified region of critical dynamics is disrupted the control the onset of oscillatory instabilities in the turbulent flow system.

11 Claims, 18 Drawing Sheets

(58) Field of Classification Search
CPC .......... G01P 15/00; G01P 15/036; G01P 3/62;
G01P 5/001; G01P 5/08; G01P 5/24;
G01P 5/245; G01P 5/247; G01P 7/00;
G01M 9/06; G01M 9/04; G01M 10/00;
G01M 9/062; G01M 9/067; G01M 9/08;
G01M 5/0016; G01M 5/005; G01M
9/065; G01M 5/0058
USPC ...................................................... 73/170.01
See application file for complete search history.

(56) References Cited

U.S. PATENT DOCUMENTS

| | | | |
|---|---|---|---|
| 2015/0260609 A1* | 9/2015 | Vinod ................. | F02D 41/1498 |
| | | | 702/56 |
| 2016/0282885 A1* | 9/2016 | Unni ................... | G05B 23/0289 |
| 2019/0264916 A1* | 8/2019 | Unni ..................... | F15D 1/0025 |
| 2021/0131663 A1* | 5/2021 | Pavithran .............. | G01M 15/14 |

* cited by examiner

SYSTEM AND METHOD FOR OPTIMIZING PASSIVE CONTROL STRATEGIES OF OSCILLATORY INSTABILITIES IN TURBULENT SYSTEMS USING FINITE-TIME LYAPUNOV EXPONENTS

CROSS-REFERENCES TO RELATED APPLICATION

This application claims priority to Indian Patent Application No. 201941022545, filed on Jun. 6, 2019, the full disclosure of the complete specification filed in pursuance of that application is incorporated herein by reference.

FIELD OF THE INVENTION

The disclosure relates generally to mitigating onset of impending oscillatory instabilities in turbulent flow systems and, in particular, to systems and methods for determining critical regions to control onset of impending oscillatory instabilities and controlling various parameters to prevent oscillatory instabilities.

DESCRIPTION OF THE RELATED ART

Fluid dynamic systems undergo oscillatory instabilities that may be undesirable in the long run. Oscillatory instabilities may be characterized by incoherent turbulent fluctuations, which are observed in the reactive flow field, during stable operation of a system. As the operating conditions change, bursts of high amplitude periodic oscillations are observed in pressure traces intermittently amidst a state of aperiodic fluctuations. A complete transition to very high amplitude periodic oscillations may emerge under certain operating conditions. The high amplitude periodic oscillations exhibited by the acoustic field inside such systems during this dynamical regime are generally known as thermoacoustic instability.

Oscillatory instabilities may be undesirable for many reasons. For instance, the instabilities could affect the structural integrity leading to engine failure, in cases of gas turbines and rocket engines. Thus, active research is carried out on methods to predict and mitigate their occurrence in practical combustion systems. Further, there are oscillatory instabilities in aero-acoustics, aero-elastic, and many other turbulent flow systems such as surge in compressors. In aero-acoustic systems, the positive feedback coupling between the acoustic field of the confinement and vortex shedding is the main cause for oscillatory instability. In aero-elastic systems, the oscillatory instability is due to the flow interacting with the structure. There are many other turbulent flow systems known in the art where oscillatory instability prevails.

In order to forewarn thermoacoustic instability, several precursors to instability have been developed that quantify the burst states in intermittent regime: 0-1 test, recurrence tests and generalized Hurst exponent tests, and the like. Although useful, these precursors do not provide a way to identify the underlying dynamics responsible for this intermittent transition to instability.

Further, various publications have attempted to address some of the challenges associated with predicting onset of oscillatory instabilities in dynamical systems. Researchers have used finite-time Lyapunov exponent (FTLE) to find the regions of distinct flows in wind turbine flows (Wilson 2012). Backward-time FTLE has also been employed to understand the mechanism for intermittent sound sources (Premchand et. al 2019). Additionally, Indian Patent Application No. 201841007455 includes the identification of the critical regions using complex network and optimizing the passive control of oscillatory instabilities in turbulent flows. However, these approaches do not identify the dynamics responsible for instabilities and do not discuss optimized passive control methods to suppress thermoacoustic instabilities by identifying critical regions.

SUMMARY OF THE INVENTION

According to one embodiment of the present subject matter, a computer implemented method of controlling onset of oscillatory instabilities in a turbulent flow system is disclosed. The method includes receiving data from one or more measuring devices connected to the turbulent flow system incorporating a control strategy in the flow field. One or more flow characteristics are determined from the data obtained from the measuring devices. The method involves computing critical dynamics from backward time finite-time Lyapunov exponent (FTLE) field based on the one or more flow characteristics. Next, the method involves identifying one or more regions of critical dynamics associated with impending oscillatory instabilities in the turbulent flow system. Finally, the method includes disrupting the identified region of critical dynamics to control the onset of oscillatory instabilities in the turbulent flow system.

In some embodiments, the data is received using the technique of Particle Image Velocimetry (PIV), computational fluid dynamics (CFD) methods including Direct Numerical Simulations (DNS) and Large Eddy Simulation (LES), and photomultiplier tube and high speed cameras. In some embodiments, the method includes performing signal conditioning processes on the data obtained from measuring device, wherein the signal conditioning processes comprises noise filtering and signal amplification. In various embodiments, the flow characteristics comprise computation of a flow-map function indicative of the displacement of fluid parcels for one or more time intervals.

In various embodiments, identifying one or more critical regions comprises selecting one or more common regions above a predetermined threshold value in FTLE fields. In some embodiments, the control strategy comprises an active control strategy in the flow field, the active control strategy comprising actuating a valve to control the flow velocity to control the onset of oscillatory instabilities in a turbulent flow system.

According to another embodiment of the present subject matter, a system for controlling onset of oscillatory instabilities in a turbulent flow system is disclosed. The system includes a memory unit, one or more measuring devices configured to measure data associated with turbulent flow system incorporating a control strategy in the flow field, and a processor coupled to the memory unit. The processor is configured to receive data from one or more measuring devices connected to the turbulent flow system. The processor determines one or more flow characteristics from the data obtained from the measuring devices. The processor then computes critical dynamics from a backward time finite-time Lyapunov exponent (FTLE) based on the one or more flow characteristics. Next, the processor identifies one or more regions of critical dynamics associated with impending oscillatory instabilities in the turbulent flow system. The system also includes a passive control unit configured to disrupt the identified region of critical dynamics to control the onset of oscillatory instabilities in the turbulent flow system.

In various embodiments, the one or more measuring devices may include photo multiplier tube, high speed cameras perform, or devices configured to perform Particle Image Velocimetry (PIV). In some embodiments, the system includes a control unit configured to receive the identified one or more critical regions and control the operation of an actuating device. The actuating device is configured to actuate a valve to control the flow velocity to control the onset of oscillatory instabilities in the turbulent flow system.

According to another embodiment of the present subject matter, a computer program product having non-volatile memory therein, carrying computer executable instructions stored therein to control onset of oscillatory instabilities in a turbulent flow system is disclosed. The instructions include receiving data from one or more measuring devices connected to the turbulent flow system incorporating a control strategy in the flow field. One or more flow characteristics are determined from the data obtained from the measuring devices. The method involves computing critical dynamics from backward time finite-time Lyapunov exponent (FTLE) field based on the one or more flow characteristics. Next, the method involves identifying one or more regions of critical dynamics associated with impending oscillatory instabilities in the turbulent flow system. Finally, the method includes disrupting the identified region of critical dynamics to control the onset of oscillatory instabilities in the turbulent flow system.

This and other aspects are described herein.

BRIEF DESCRIPTION OF THE DRAWINGS

The invention has other advantages and features, which will be more readily apparent from the following detailed description of the invention and the appended claims, when taken in conjunction with the accompanying drawings, in which:

DETAILED DESCRIPTION OF THE EMBODIMENTS

Figure 1:
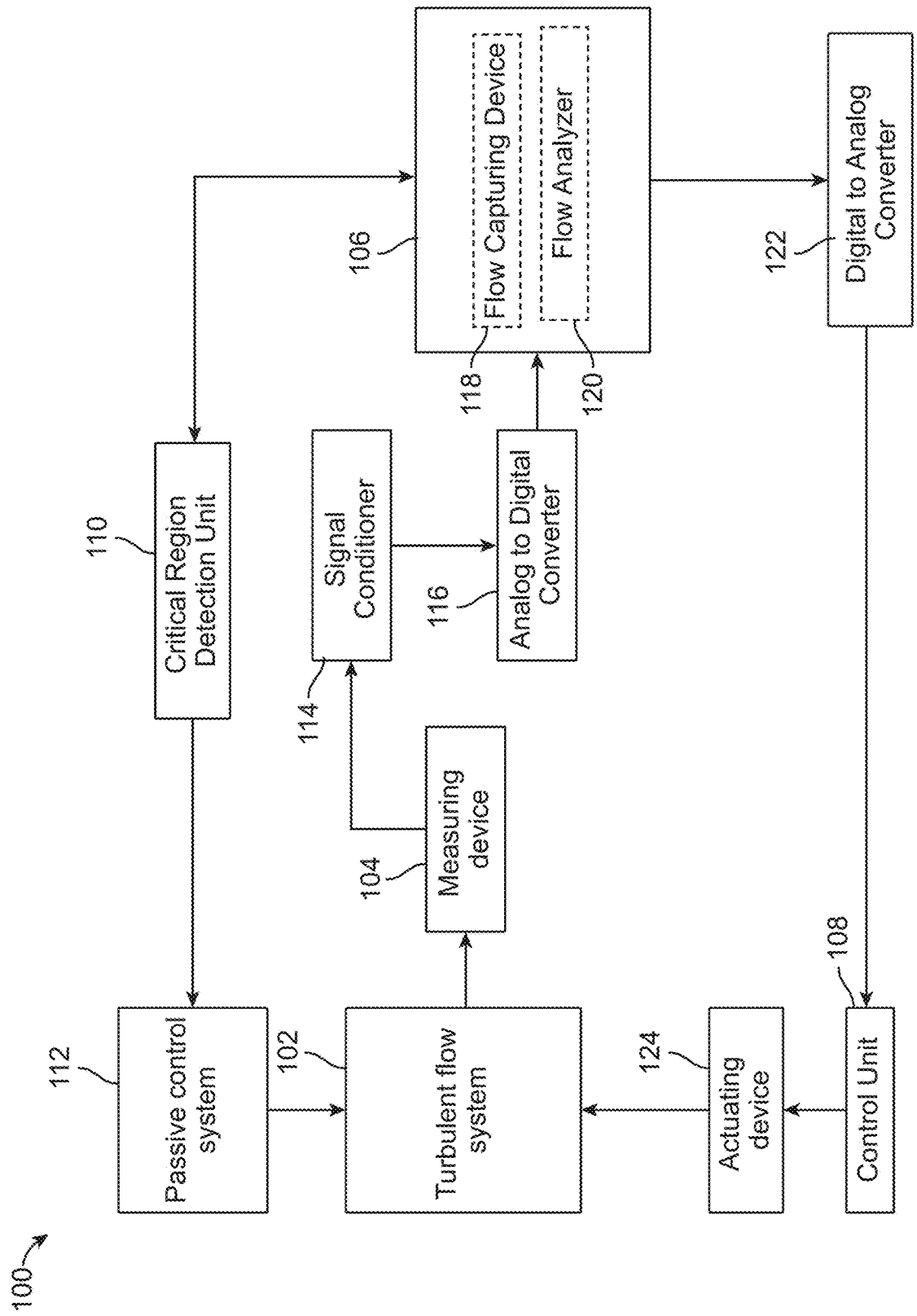
FIG. 1 illustrates a block diagram of a system for controlling onset of oscillatory instabilities in a turbulent flow system, according to an embodiment of the present subject matter.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The present subject matter describes mitigation of onset of impending oscillatory instabilities in turbulent flow systems and, in particular, to systems and methods for determining critical regions to control onset of impending oscillatory instabilities and controlling various parameters to prevent oscillatory instabilities. In some aspects, the invention may include pre-installed application or software product for such devices, or computer program product that may be marketed on removable media.

A simplified block diagram of a system for controlling onset of oscillatory instabilities in a turbulent flow system is illustrated in FIG. 1, according to one embodiment of the present subject matter. The system 100 may primarily include a turbulent flow system 102, one or more measuring devices 104, a flow processing unit 106, a control unit 108, a critical region detection unit 110, and a passive control system 112. In various embodiments, the turbulent flow system 102 may be a thermoacoustic system, an aeroacoustic system, an aeroeleastic system, or any other turbulent system known in the art, which has or may be susceptible to oscillatory instabilities.

The turbulent system 102 may be connected to the plurality of measuring devices 104 that are configured to measure various parameters including, but not limited to, pressure, velocity, global heat release rate, local heat release rate, etc. In various embodiments, the plurality of measuring devices 104 may include systems or devices performing Particle Image Velocimetry (PIV), Computational Fluid Dynamics (CFD) methods, such as Direct Numerical Simulations (DNS) and Large Eddy Simulation (LES). In some embodiments, the measuring devices may also include photo multiplier tube, high speed cameras, and the like.

In some embodiments, the system 100 may include a signal conditioner 114 for performing signal conditioning processes like filtering noise and amplifying signal to make the measured data suitable for processing. After the signal conditioning process, an analog to digital converter 116 may convert the processed signals from analog to digital format, which may then be used by the flow processing unit 106. In some embodiments, the velocity measurements and the local heat release rate may be measured using a flow capturing device 118. The flow analyzer 120 may be configured to compute finite time Lyapunov exponent (FTLE) field based on the one or more flow characteristics. In some embodiments, the critical region detection unit 110 may be configured to identify regions of critical dynamics in the backward time FTLE.

In various embodiments, the passive control system 112 may be configured to disrupt the identified region of critical dynamics to control the onset of oscillatory instabilities in the turbulent flow system. In some embodiments, the control unit 108 may be configured to receive analog signals from digital to analog signal converter 114 coupled to the flow processing unit 106. The analog signals may represent the one or more critical regions and control the operation of an actuating device 124, which may be configured to actuate a valve to control the flow velocity to control the onset of oscillatory instabilities in the turbulent flow system.

Figure 2:
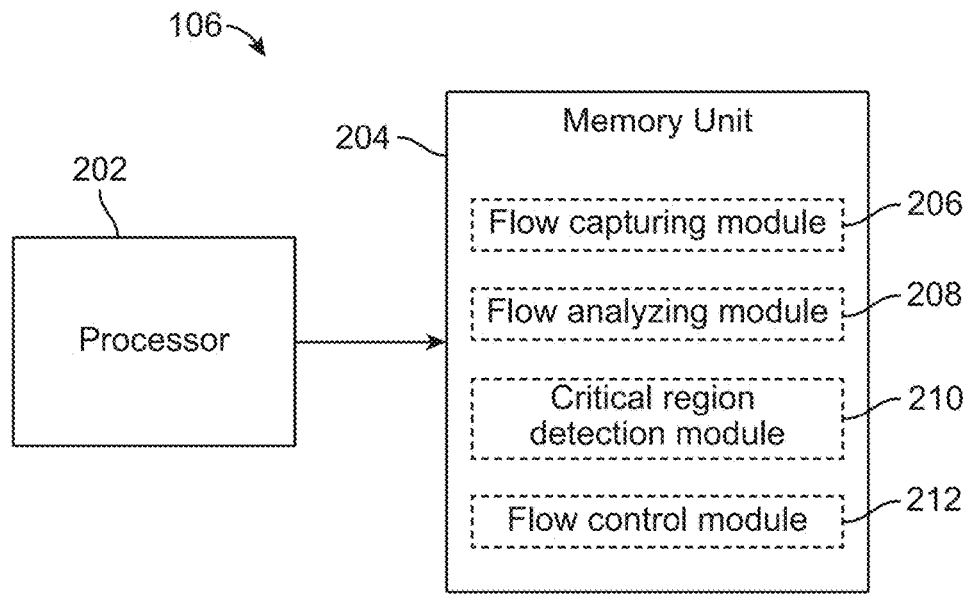
FIG. 2 illustrates processing and memory units of the system, according to one embodiment of the present subject matter.

A block diagram of the flow processing unit 106 is illustrated in FIG. 2, according to one embodiment of the present subject matter. The flow processing unit 106 may be implemented in a single system or distributed across several devices networked together to perform one or more functions. The flow processing unit 106 may include a processor 202 coupled to a memory unit 204. The memory unit may 204 may include a plurality of modules to be executed by the processor 202. The plurality of modules may include a flow capturing module 206, a flow analyzing module 208, a critical region detection module 210, and a flow control module 212. In various embodiments, the modules may be implemented as one or more software modules, hardware modules, firmware modules, or a combination of these.

The flow capturing module 206 may be configured to receive data from one or more measuring devices 104 connected to the turbulent flow system 102. In some embodiments, the flow capturing module 206 may initiate signal preconditioning and analog to digital signal conversion when receiving the data from the measuring devices 104. In some embodiments, the flow capturing module 206 may be implemented in a system capable of performing Particle Image Velocimetry (PIV), Computational Fluid Dynamics (CFD) methods, such as Direct Numerical Simulations (DNS) and Large Eddy Simulation (LES).

The flow analyzing module 208 may be configured to determine one or more flow characteristics from the data obtained by the flow capturing module 206. The flow characteristics may include computation of a flow-map function indicative of the displacement of fluid parcels in the turbulent flow system for one or more time intervals. The flow analyzing module 208 may also be configured to compute critical dynamics from backward time finite-time Lyapunov exponent (FTLE) fields based on the one or more flow characteristics.

The critical region detection module 210 may be configured to detect regions of critical dynamics associated with impending oscillatory instabilities in the turbulent flow system 102. The maximum values in the contour of the backward time FTLE fields are indicative of the dynamics with highest oscillatory instabilities, such as strongest sound production, and the regions with such critical dynamics, once identified, may be used as targets for secondary air injection. In some embodiments, identifying the one or more critical regions may include selecting one or more regions above a predetermined threshold value in the FTLE fields.

In other embodiments, the critical region detection module 210 may be configured to overlay forward time finite-time Lyapunov exponent (FTLE) and backward time FTLE to determine common saddle points. There are numerous common/saddle points inside a saddle region. The module may further be configured to identify the critical regions by comparing the saddle region with vorticity field. The vorticity field includes vortex cores that are identified to be the region of maximum of absolute vorticity. In general, it is seen that the critical regions are present upstream and downstream of the vortex core. The critical region detection module may be configured to obtain the critical regions by selecting saddle regions that are above a certain threshold value in FTLE fields that may be user-defined and system dependent.

The flow control module 212 may be configured to select a control strategy to mitigate the onset of oscillatory instabilities in turbulent flow system 102. In some embodiments, the flow control module 212 may be configured to select a passive control strategy to modify the geometry of the system using for example, Helmholtz resonators, acoustic liners, or by performing modification of the geometry or location of the air or fuel injector, baffles or micro jet injection to achieve control. In some embodiments, a secondary air injection may be used to disrupt the critical dynamics responsible for sound production during oscillatory instabilities.

Figure 3:
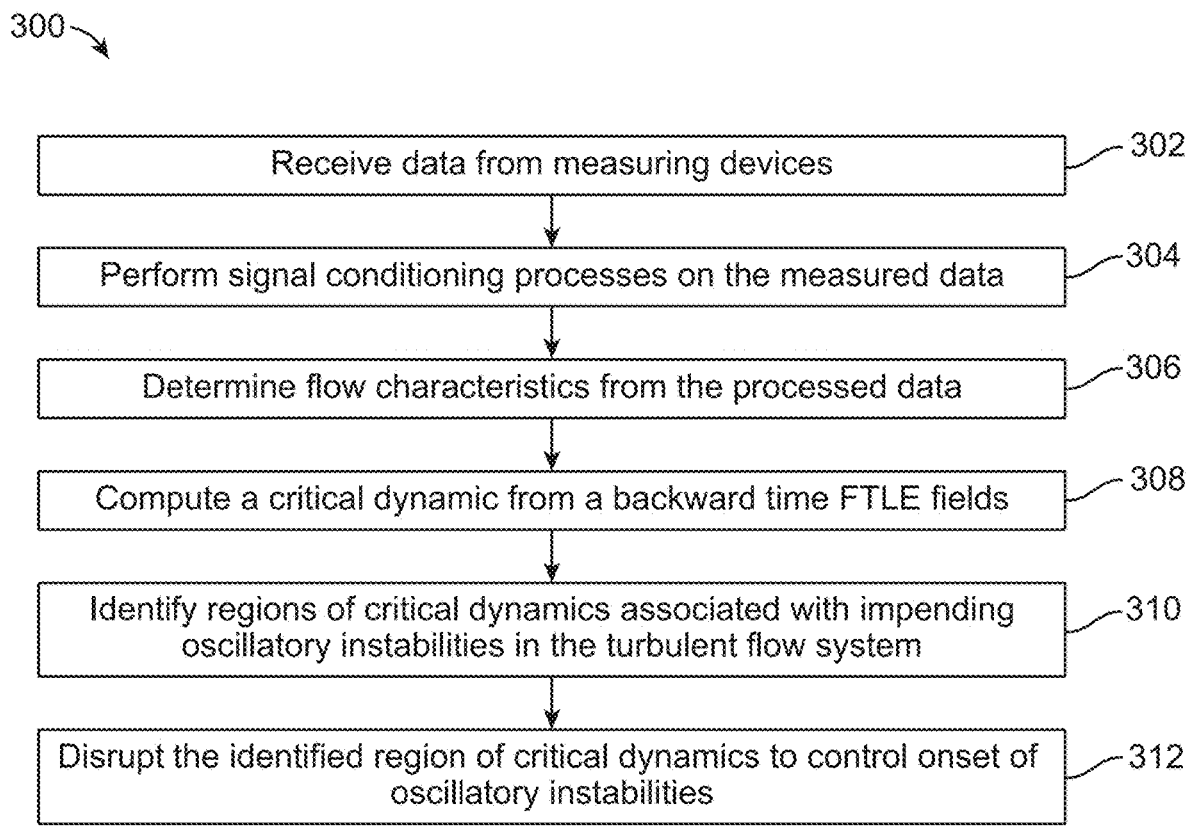
FIG. 3 illustrates method of controlling onset of oscillatory instabilities in a turbulent flow system, according to an embodiment of the present subject matter.

A flow diagram of a method of controlling onset of oscillatory instabilities in a turbulent flow system is illustrated in FIG. 3, according to one embodiment of the present subject matter. The method may include receiving data from one or more measuring devices 104 connected to the turbulent flow system 102 at block 302. The received data may undergo a signal conditioning process to remove noise and signal amplification at block 304. One or more flow characteristics may be determined from the data obtained from the measuring devices at block 306. In various embodiments, the flow characteristics comprise computation of a flow-map function indicative of the displacement of fluid parcels for one or more time intervals. The flow map function may be given by $F_{t_0}^t := x(t, t_0, x_0)$. In some embodiments, Jacobian of flow map $F_{t_0}^t(x_0)$ after the displaced position of the fluid particle is determined.

Next, the method involves the step of computing critical dynamics from backward time finite-time Lyapunov exponent (FTLE) field based on the one or more flow characteristics at block 308. In some embodiments, the FTLE field may be computed using maximum eigenvalue of right Cauchy-Green strain tensor $C_{t_0}^t := x(x_0, t_0)$. The right Cauchy-Green strain tensor may be defined as, $$C_{t_0}^t := x(x_0, t_0) = [\nabla F_{t_0}^t(x_0)]^T [\nabla F_{t_0}^t(x_0)] \quad (1)$$

In equation (1), T represents transpose operation. The right Cauchy-Green strain tensor $C_{t_0}^t := x(x_0, t_0)$ is a square matrix with size same as the dimension of the flow field under consideration: i.e., $C_{t_0}^t := x(x_0, t_0)$ is 2×2 matrix for 2D flow field. Finite time Lyapunov exponent field $\sigma_{t_0}^t(x_0, t_0)$ are related to the largest eigenvalue of the right Cauchy-Green strain tensor $C_{t_0}^t := x(x_0, t_0)$ as $$\sigma_{t_0}^t := x(x_0, t_0) = \frac{1}{|T|} \ln \sqrt{\lambda_{max}(C_{t_0}^t(x_0, t_0))} \quad (2)$$

In equation 2, the rate of separation of neighboring trajectories of fluid parcels which maybe initially close are quantified using $\sigma_{t_0}^t(x_0, t_0)$ and $T=t-t_0$. The ridges in the FTLE field in forward time indicate maximal repelling LCS (or forward-time LCS) over a finite time interval T When the particle advection is performed backward in time, the ridges indicate maximal attracting LCS (or backward-time LCS). In some embodiments, overlaying attracting LCS over repelling LCS, common points of dynamic significance termed saddle points may be obtained. The common points may be a heuristic indicator of the location of saddle points.

Next, the method involves identifying one or more regions of critical dynamics associated with impending oscillatory instabilities in the turbulent flow system at block 310. The identification of one or more critical regions may include selecting one or more regions above a predetermined threshold value in the FTLE fields. Finally, the method includes disrupting the identified region of critical dynamics to control the onset of oscillatory instabilities in the turbulent flow system at block 312. In some embodiments, a passive control strategy involving a secondary air injection may be used to disrupt the critical dynamics responsible for sound production during oscillatory instabilities. Disrupting the identified region may involve altering the flow field in the identified region of critical dynamics to prevent onset of oscillatory instabilities. In some embodiments, disrupting the identified region of critical dynamics may include implementing an active control strategy in the flow field. The active control strategy may include actuating a valve to control the flow velocity to control the onset of oscillatory instabilities in a turbulent flow system.

Further, the FTLE computation used in above method and system may be implemented in various stages of oscillatory instabilities event. For instance, FTLE fields may be computed in a cycle of acoustic pressure oscillation in the regime of thermoacoustic instability, a cycle of burst oscillation in the intermittent regime, a time window without bursts in the intermittent regime, before and after injecting secondary air jet, etc. FTLE fields provide an instantaneous picture of the critical dynamics in the flow-field responsible for sound production during oscillatory instabilities. Thus, control strategies are more easily achieved using FTLE fields as it provides an instantaneous, physical picture of the regions of sound production during oscillatory instabilities. Upon application of control strategies based on the FTLE field computation, the oscillations may be suppressed by almost 90%. In comparison to the existing solutions, such as use of complex network construction which provides a time-averaged indication of the location of critical dynamics, the FTLE provide instantaneous detection of critical dynamics. Also, FTLE fields have a physical basis in fluid mechanics unlike complex networks, where the physical interpretation is difficult.

EXAMPLES

Velocity data was obtained from the turbulent flow system at various stages of instabilities using measuring devices. In each stage, the ridges of FTLE fields were computed using the velocity data along with chemiluminescence or with vorticity plots. The computation of FTLE fields in various stages is described below:

Example 1A

Figure 4A:
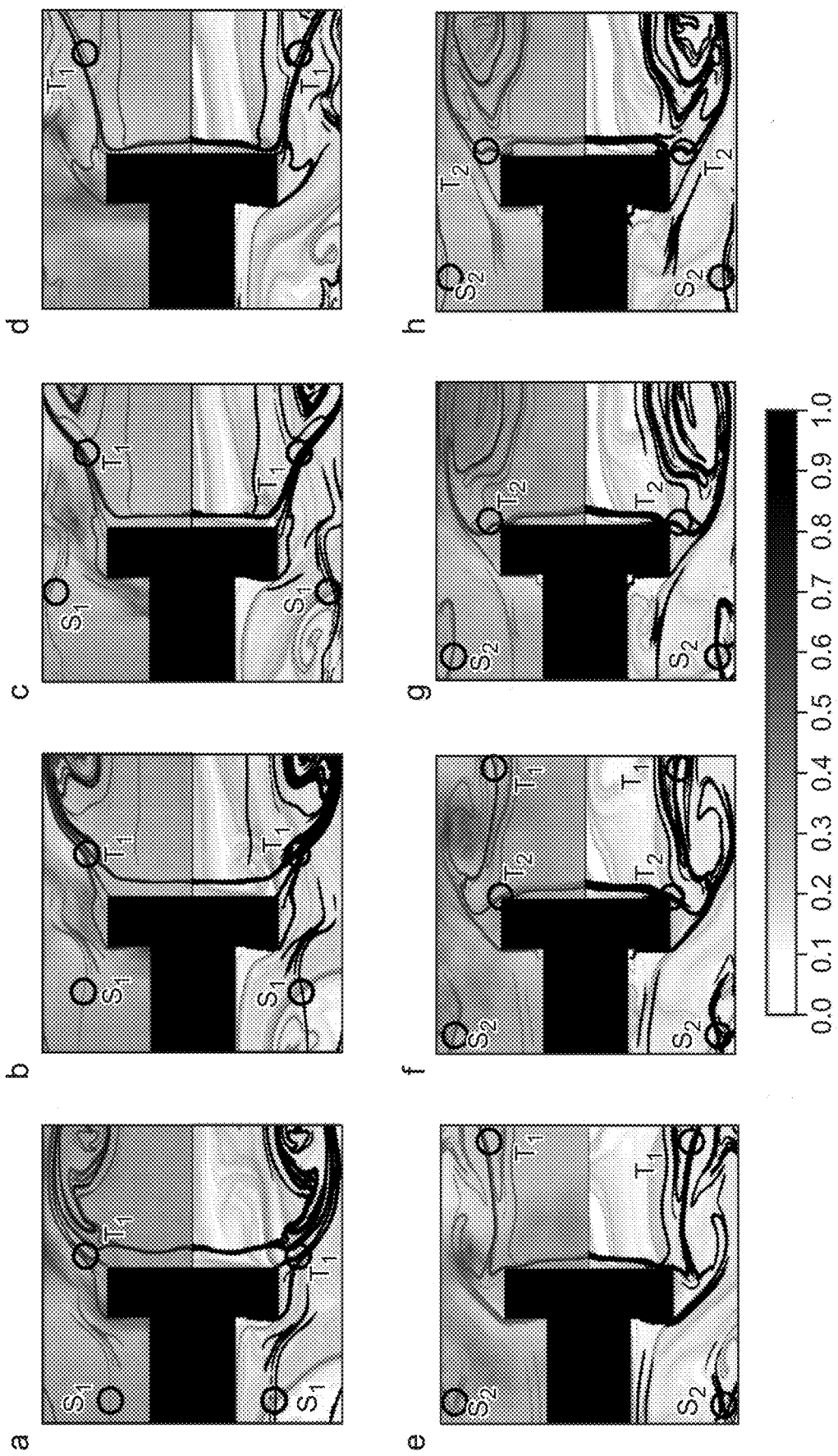
FIG. 4A illustrates ridges of FTLE fields computed with velocity data along with chemiluminescence and ridges of backward-time FTLE field overlaid on ridges of forward-time FTLE field, according to an embodiment of the present subject matter.
Figure 4B:
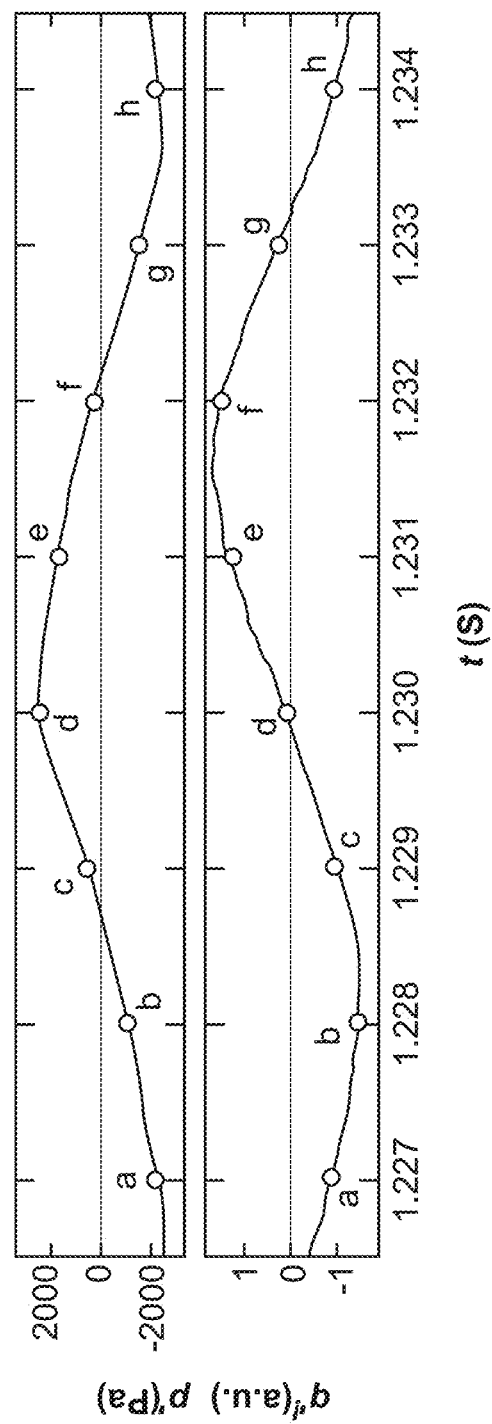
FIG. 4B illustrates pressure fluctuations and global heat release rate fluctuations corresponding to a time period of thermoacoustic instability, according to an embodiment of the present subject matter.

FTLE Field Computation in Thermoacoustic Instability Regime with CH* Chemiluminescence The ridges of FTLE fields computed with the velocity data along with CH* chemiluminescence showing local heat release rate fluctuations over a cycle of acoustic pressure oscillation in the regime of thermoacoustic instability is illustrated in FIG. 4A. The top panels (a) to (d) show backward-time FTLE ridges along with CH* chemiluminescence. In bottom panels (e) to (h), the ridges of backward-time FTLE field (black contour lines) are overlaid on ridges of forward-time FTLE field (gray filled contour). The contour levels have been normalized with the maximum value of the FTLE field. The critical regions are marked using black circles S1, S2, T1 and T2. Unsteady pressure fluctuations (p') and global heat release rate fluctuations (q') corresponding to a time period of thermoacoustic instability are shown in FIG. 4B. Flow is from left to right. The shear layer flapping in the upstream of the bluff-body and from the leading edge of the bluff-body are responsible for tonal sound production.

Example 1B

Figure 5A:
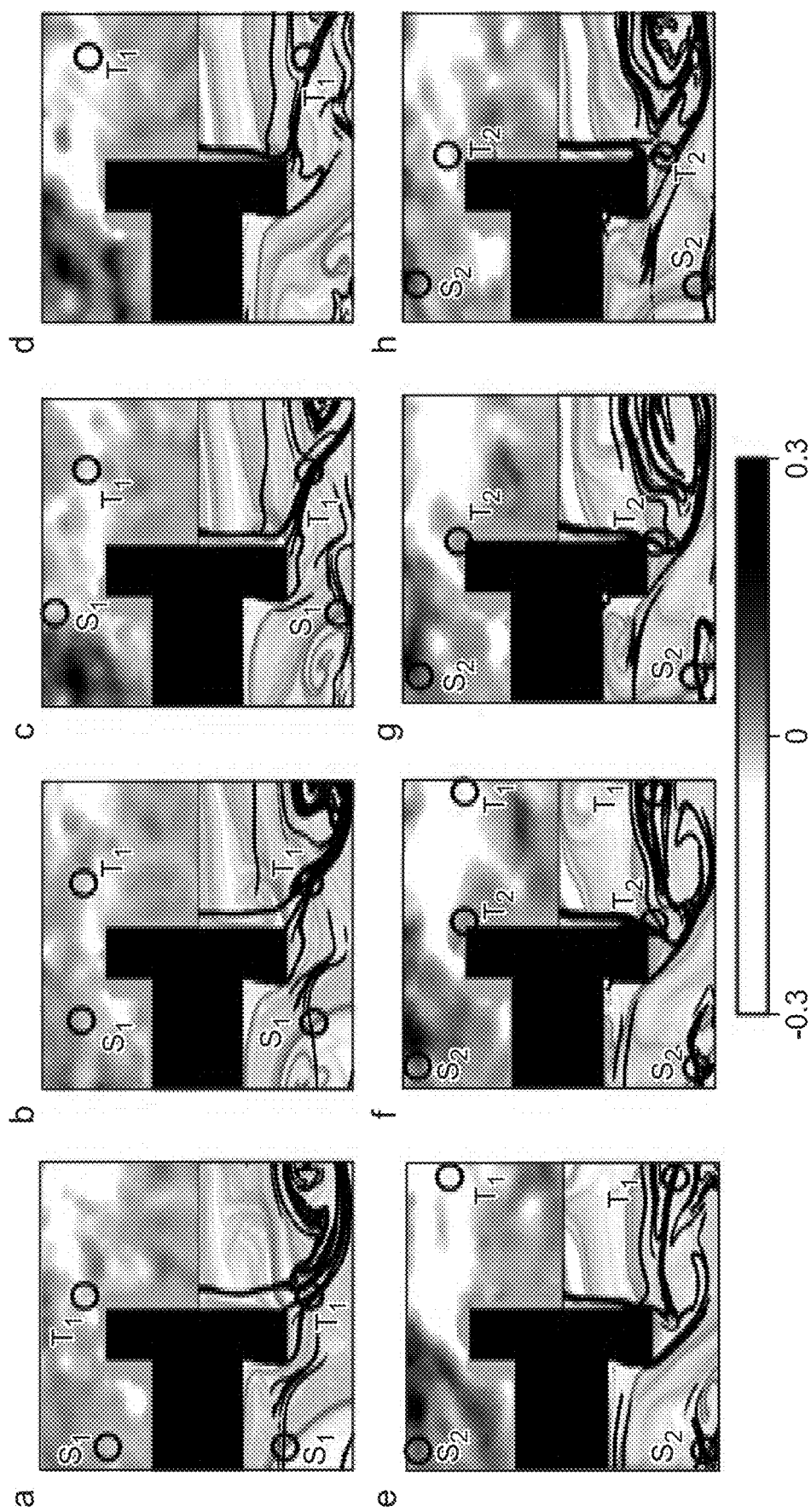
FIG. 5A illustrates FTLE fields computed with velocity data along with vorticity plots and ridges of backward time FTLE overlaid on forward-time FTLE field, according to one embodiment of the present subject matter.
Figure 5B:
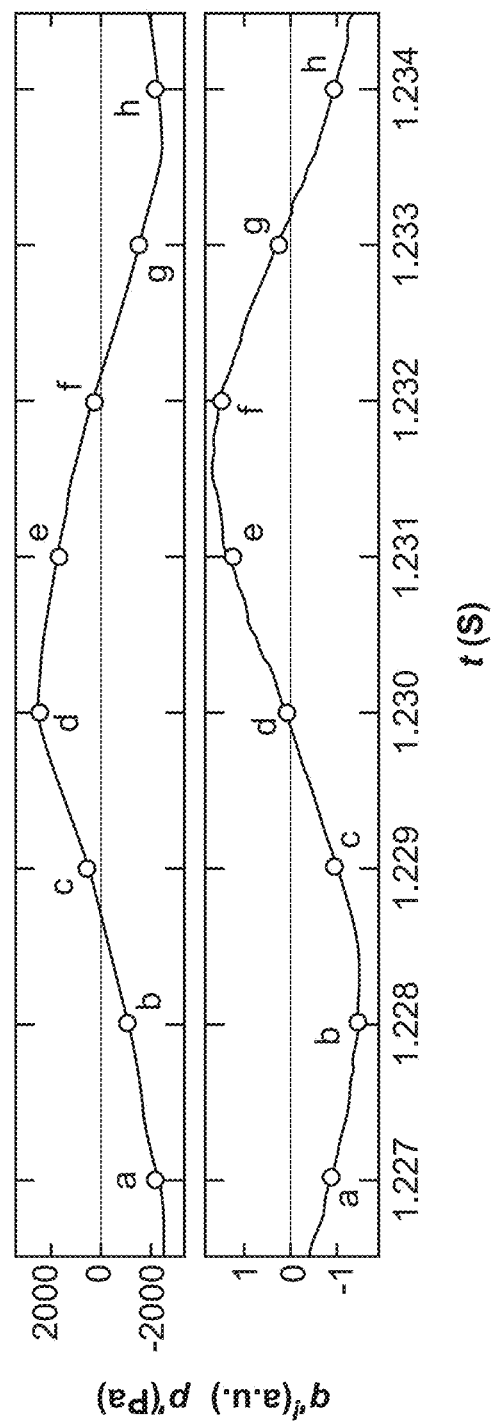
FIG. 5B illustrates pressure fluctuations and global heat release rate fluctuations corresponding to a time period of thermoacoustic instability, according to an embodiment of the present subject matter.

FTLE Field Computation in Thermoacoustic Instability Regime with Vorticity Plots Ridges of FTLE fields computed with the velocity data along with vorticity plots over a cycle of acoustic pressure oscillation in the regime of thermoacoustic instability is illustrated in FIG. 5A. The top panels (a) to (d) show vorticity plots. In bottom panels (e) to (h), the ridges of backward-time FTLE field (black contour lines) are overlaid on ridges of forward-time FTLE field (gray filled contour). The critical regions are marked using black circles S1, S2, T1 and T2 on both top and bottom panels. Unsteady pressure fluctuations (p') and global heat release rate fluctuation (q') corresponding to a time period of thermoacoustic instability are shown in FIG. 5B. Flow is from left to right.

Example 2A

Figure 6A:
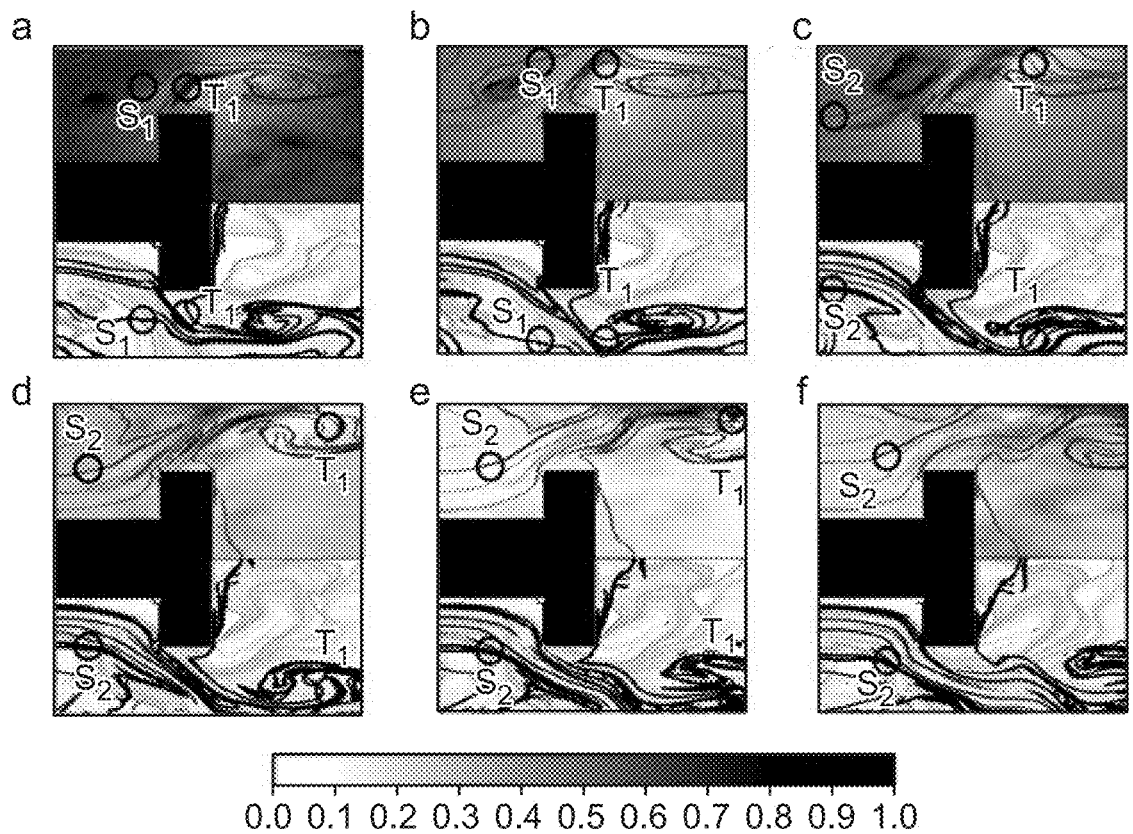
FIG. 6A illustrates FTLE field computation in a cycle of burst oscillation in the intermittent regime with CH* chemiluminescence, according to an embodiment of the present subject matter.
Figure 6B:
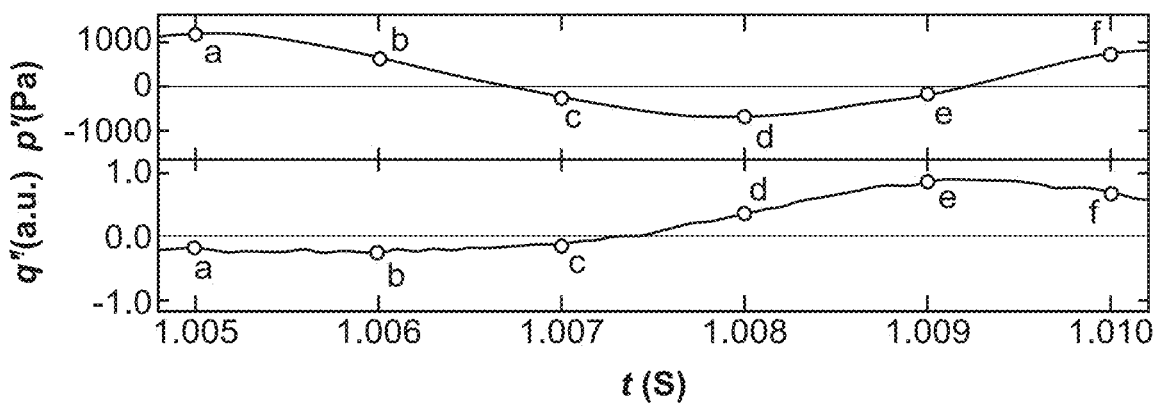
FIG. 6B illustrates pressure fluctuations and global heat release rate fluctuations corresponding to a time period of intermittency, according to one embodiment of the present subject matter.

FTLE Field Computation in a Cycle of Burst Oscillation in the Intermittent Regime with CH* Chemiluminescence Ridges of FTLE fields computed with the velocity data along with CH* chemiluminescence showing local heat release rate fluctuations over a cycle of burst oscillation in the intermittent regime is illustrated in FIG. 6A. The top panels (a) to (c) show backward-time FTLE ridges along with CH* chemiluminescence. In bottom panels (d) to (f), the ridges of backward-time FTLE field (black contour lines) are overlaid on ridges of forward-time FTLE field (gray filled contour). The contour levels have been normalized with the maximum value of the FTLE field. The critical regions are marked using black circles S1, S2, and T1. Unsteady pressure fluctuations (p') and global heat release rate fluctuations (q') corresponding to a time period of intermittency are shown in FIG. 6B. Flow is from left to right.

Example 2B

Figure 7A:
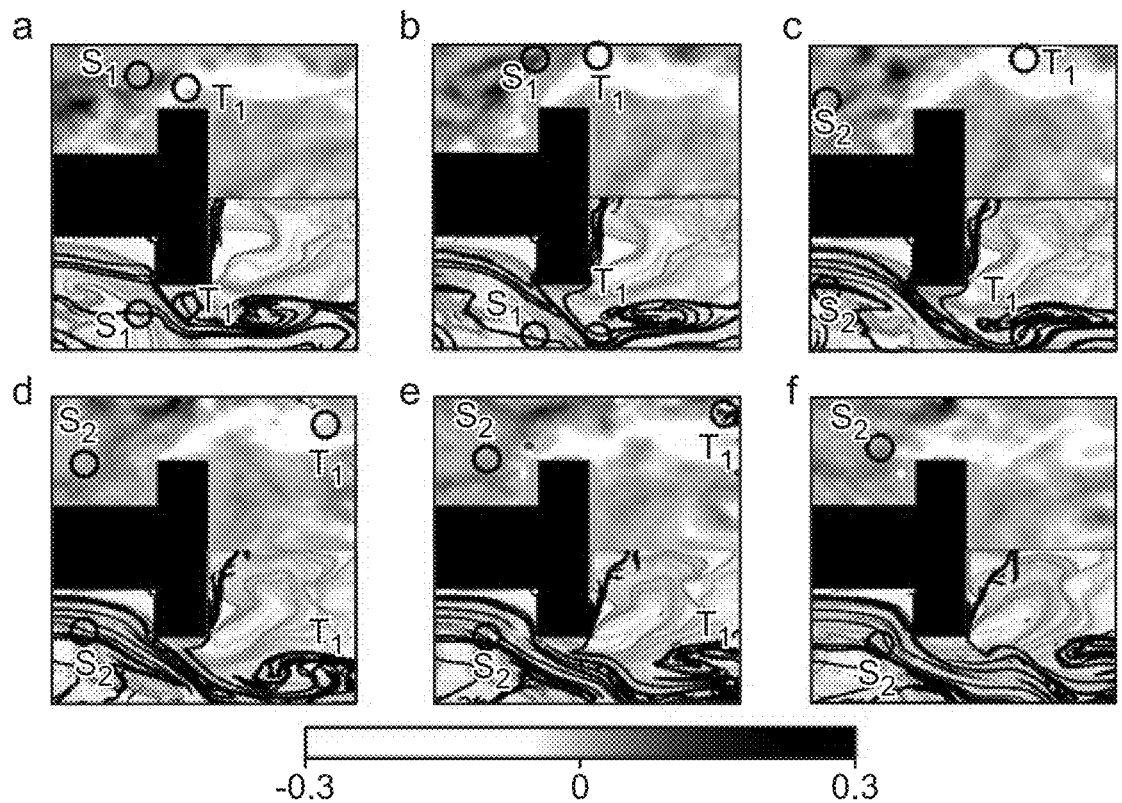
FIG. 7A illustrates FTLE field computation in a cycle of burst oscillation in the intermittent regime with vorticity plots, according to one embodiment of the present subject matter.
Figure 7B:
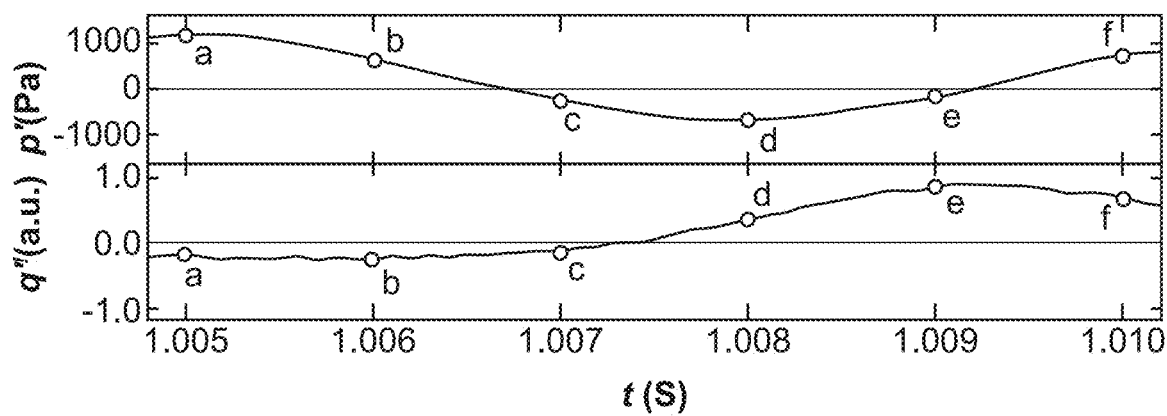
FIG. 7B illustrates pressure fluctuations and global heat release rate fluctuations corresponding to a time period of intermittency, according to one embodiment of the present subject matter.

FTLE Field Computation in a Cycle of Burst Oscillation in the Intermittent Regime with Vorticity Plots Ridges of FTLE fields computed with the velocity data along with vorticity plots over a cycle of burst oscillation in the intermittent regime is illustrated in FIG. 7A. The top panels (a) to (c) show vorticity plots. In bottom panels (d) to (f), the ridges of backward-time FTLE field (black contour lines) are overlaid on ridges of forward time FTLE field (gray filled contour). The critical regions are marked using black circles S1, S2, and T1. Unsteady pressure fluctuations (p') and global heat release rate fluctuations (q') corresponding to a time period of intermittency are shown in FIG. 7B. Flow is from left to right.

Example 3A

Figure 8A:
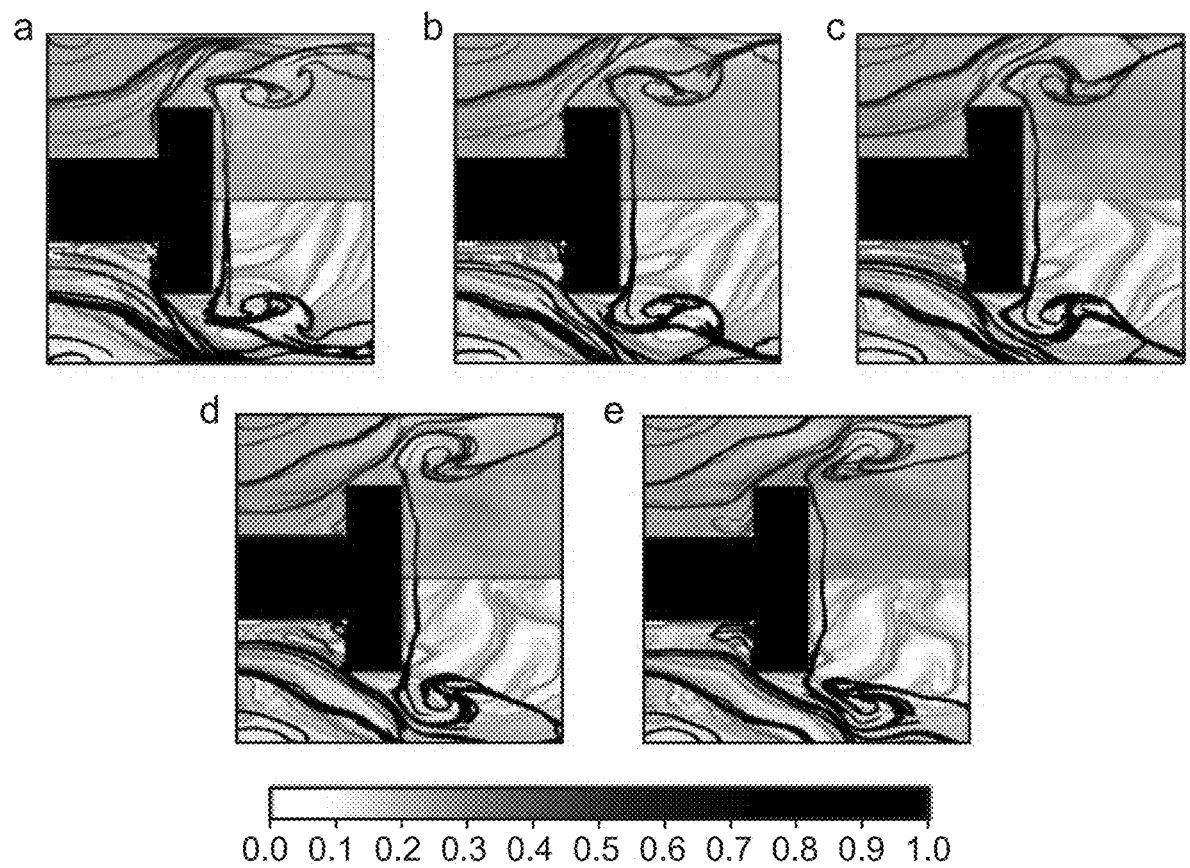
FIG. 8A illustrates FTLE field computation in a time window without bursts in the intermittent regime in the intermittent regime with CH* chemiluminescence, according to an embodiment of the present subject matter.
Figure 8B:
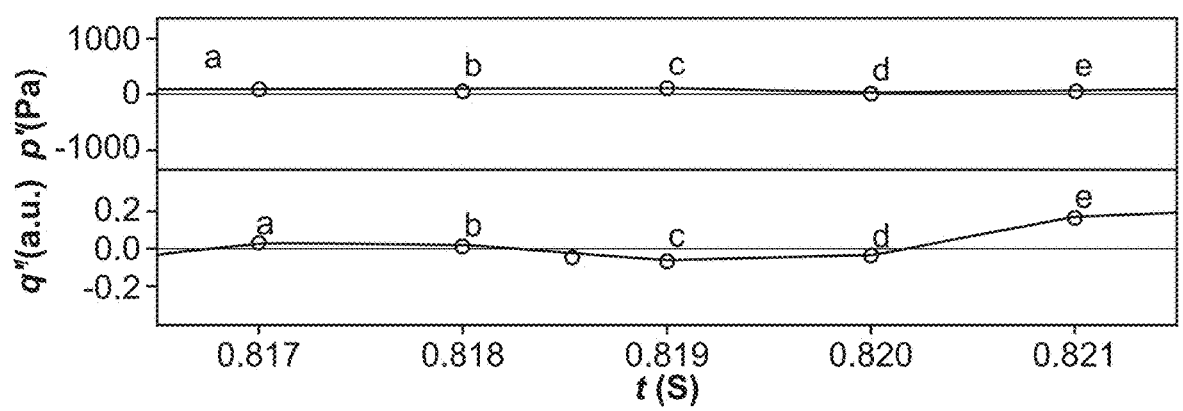
FIG. 8B illustrates pressure fluctuations and global heat release rate fluctuations corresponding to a time period without bursts in the intermittency regime, according to an embodiment of the present subject matter.

FTLE Field Computation in a Time Window Without Bursts in the Intermittent Regime with CH* Chemiluminescence Ridges of FTLE fields computed with the velocity data along with CH* chemiluminescence showing local heat release rate fluctuations over a time window without bursts in the intermittent regime is illustrated in FIG. 8A. The top panels (a) to (c) show backward-time FTLE ridges along with CH* chemiluminescence. In bottom panels (d) and (e), the ridges of backward-time FTLE field (black contour lines) are overlaid on ridges of forward-time FTLE field (gray filled contour). The contour levels have been normalized with the maximum value of the FTLE field. Unsteady pressure fluctuations (p') and global heat release rate fluctuations (q') corresponding to a time period without bursts in the intermittency regime are shown in FIG. 8B. Flow is from left to right.

Example 3B

Figure 9A:
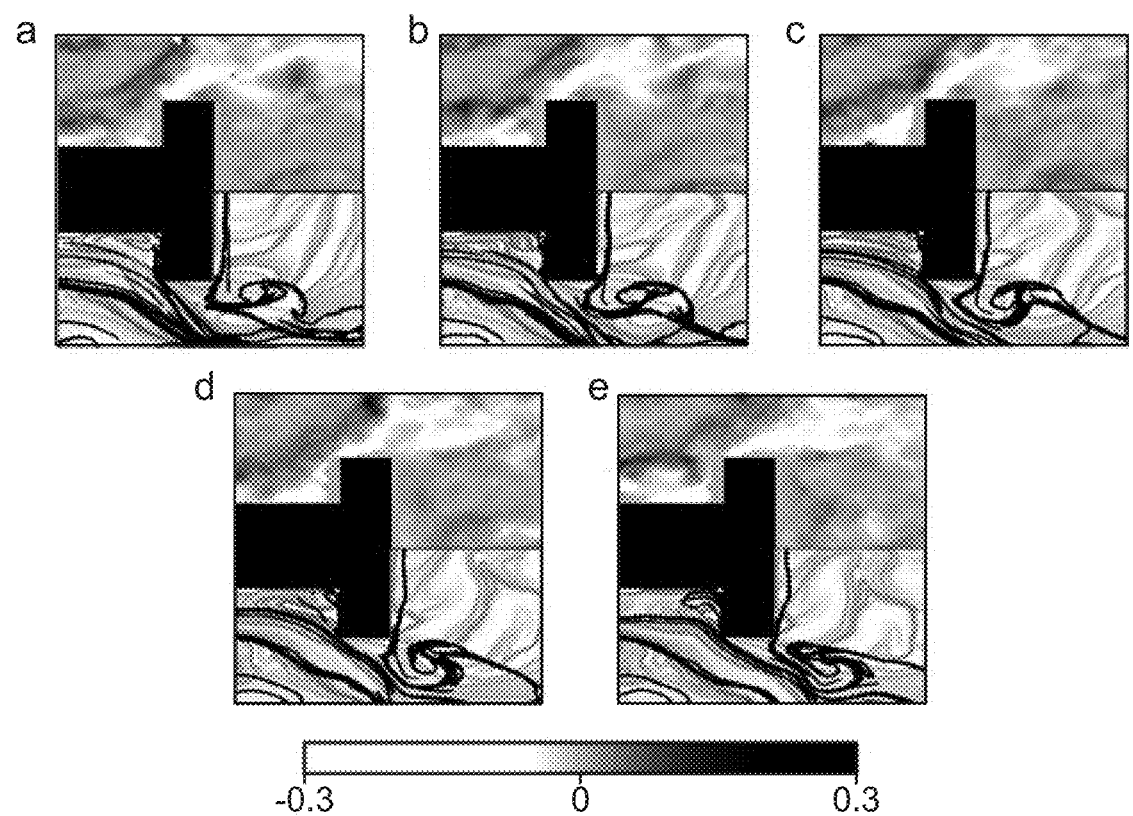
FIG. 9A illustrates FTLE field computation in a time window without bursts in the intermittent regime with vorticity plots, according to one embodiment of the present subject matter.
Figure 9B:
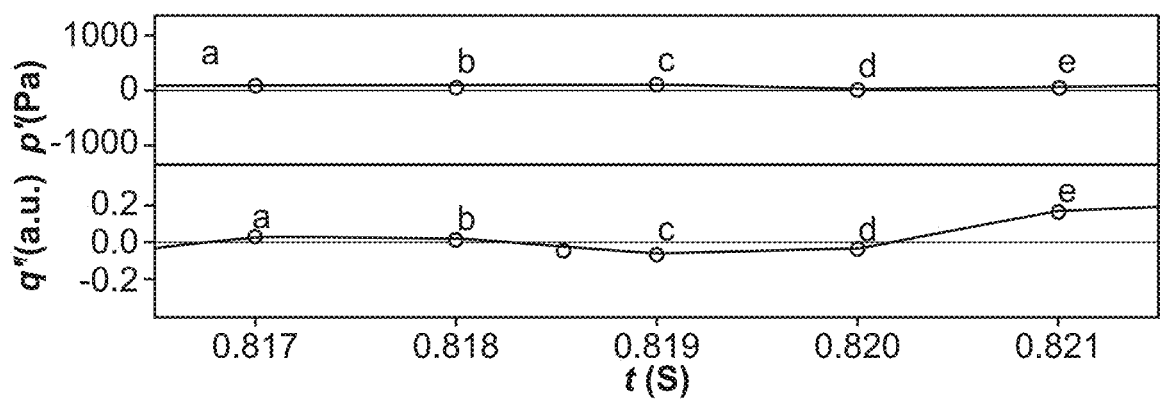
FIG. 9B illustrates pressure fluctuations and global heat release rate fluctuations corresponding to a time period without bursts in the intermittency regime, according to one embodiment of the present subject matter.

FTLE Field Computation in a Time Window without Bursts in the Intermittent Regime with Vorticity Plots Ridges of FTLE fields computed with the velocity data along with vorticity plots over a time window without bursts in the intermittent regime is illustrated in FIG. 9A. The top panels (a) to (c) show vorticity plots. In bottom panels (d) and (e), the ridges of backward-time FTLE field (black contour lines) are overlaid on ridges of forward-time FTLE field (gray filled contour). Unsteady pressure fluctuations (p') and global heat release rate fluctuations (q') corresponding to a time period without bursts in the intermittency regime are shown in FIG. 9B. Flow is from left to right.

Example 4

Figure 10A:
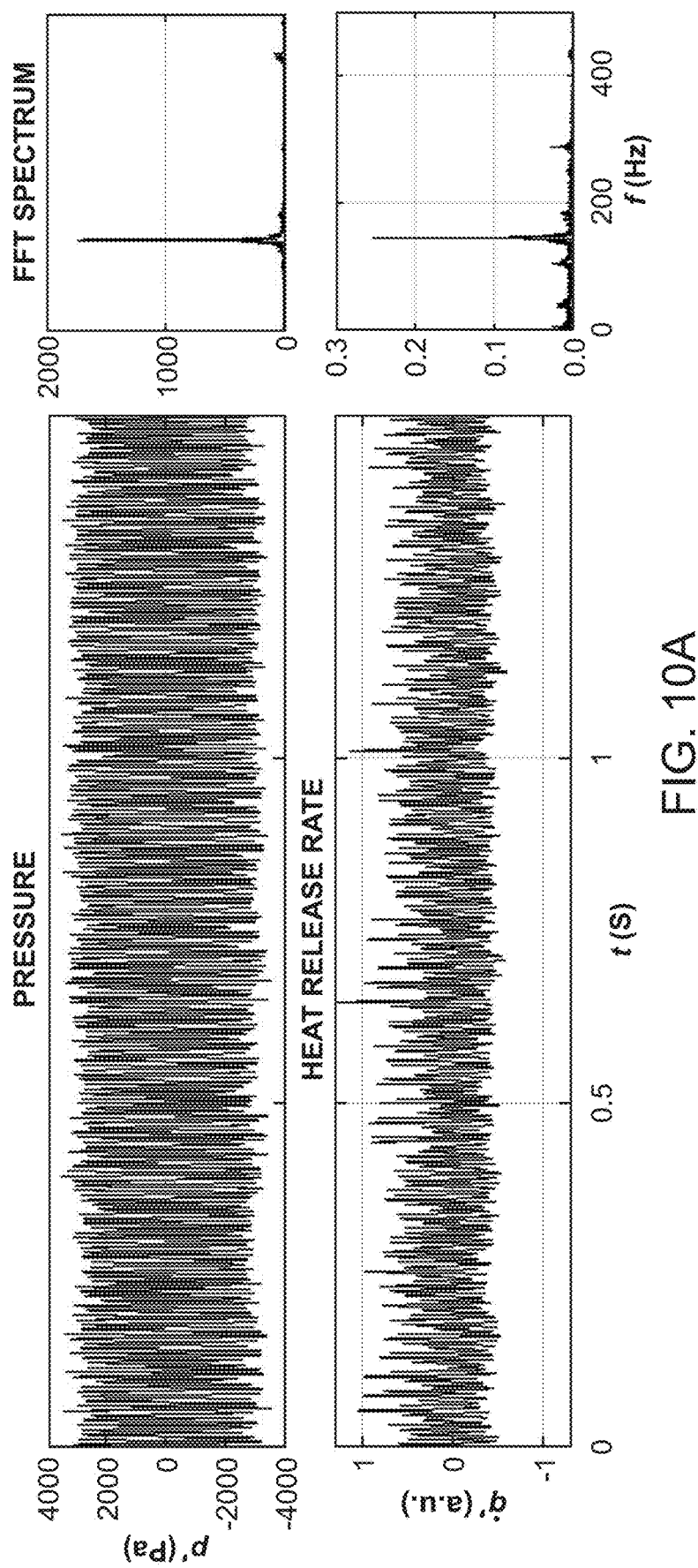
FIG. 10A illustrates fluctuations in a thermoacoustic instability regime before injecting secondary air jet for suppression, according to one embodiment of the present subject matter.
Figure 10B:
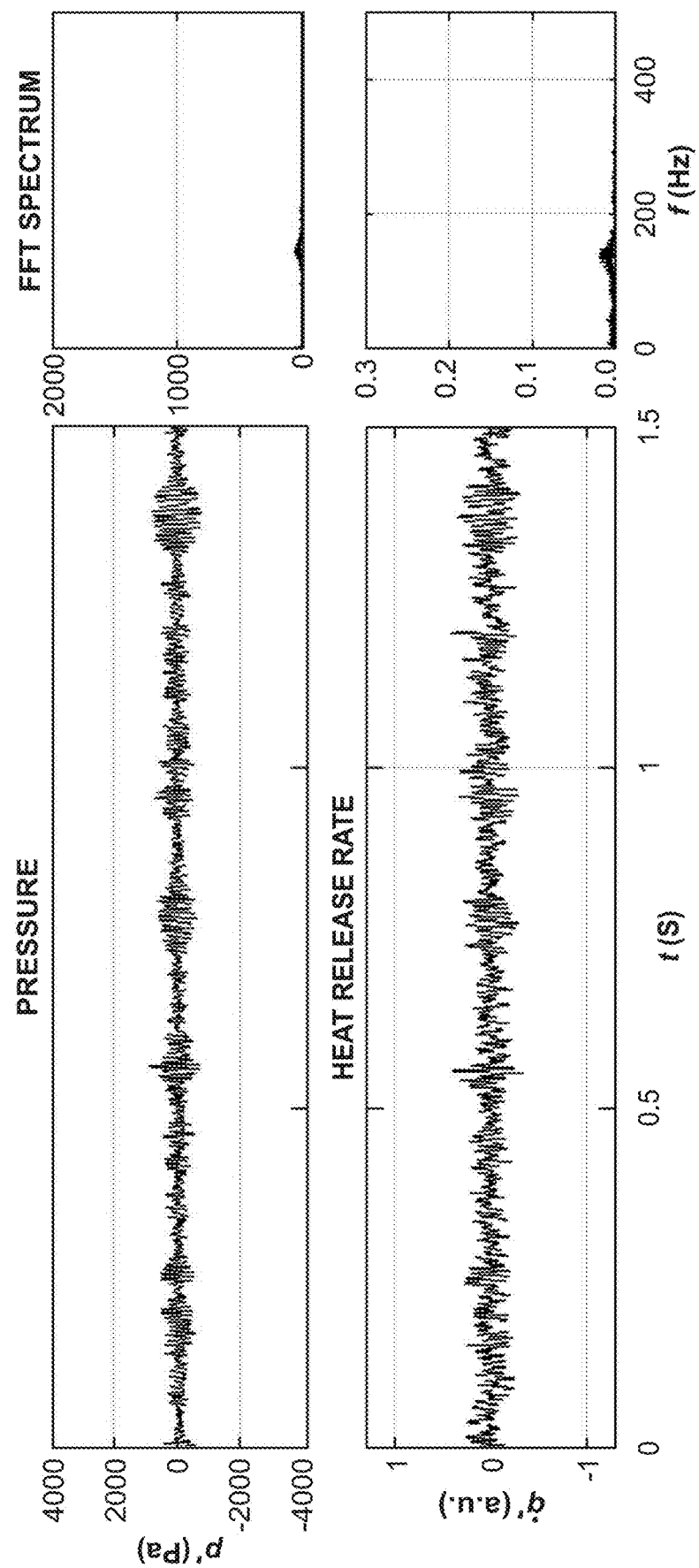
FIG. 10B illustrates fluctuations in a thermoacoustic instability regime after injecting secondary air jet for suppression, according to one embodiment of the present subject matter.
Figure 10C:
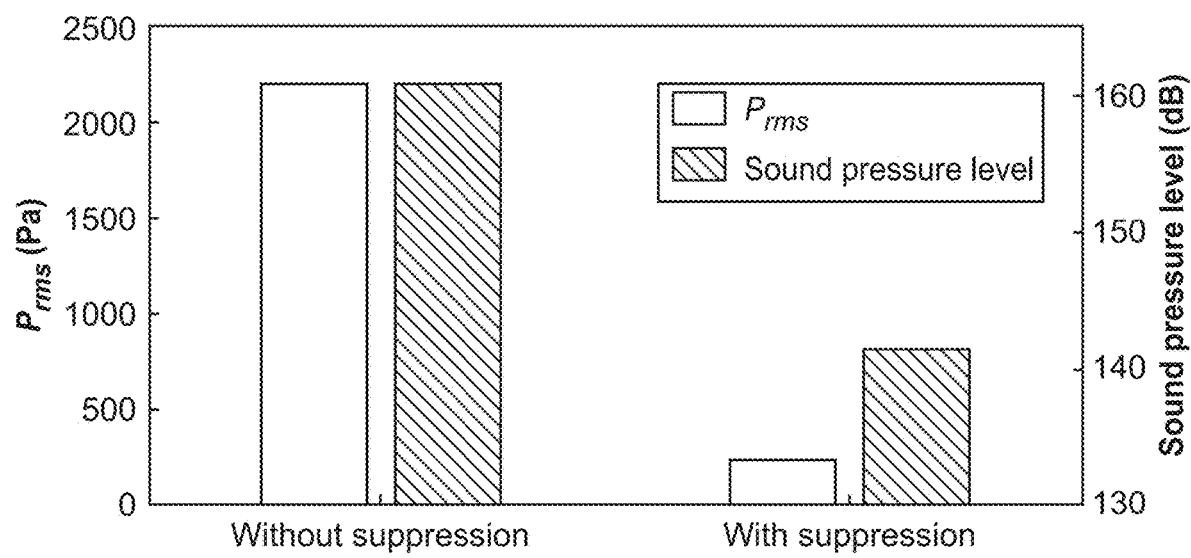
FIG. 10C illustrates amplitude difference before and after injecting secondary air jet, according to one embodiment of the present subject matter.

Fluctuations in a Thermoacoustic Instability Regime Before and After Injecting Secondary Air Jet for Suppression An unsteady pressure (top panel) and global heat release rate (bottom panel) fluctuations of a thermoacoustic instability regime before injecting secondary air jet is illustrated in FIG. 10A. In the right panels, the fast Fourier transform of the corresponding signal is shown. The FFT spectrum shows a narrow-band with the sharp peak at 143.1 Hz (1739 Pa) for both pressure fluctuations (p') and global heat release rate fluctuations (q'). An unsteady pressure (top panel) and global heat release rate (bottom panel) fluctuations of a thermoacoustic instability regime after injecting secondary jet for suppression is illustrated in FIG. 10B. In the right panels, the fast Fourier transform of the corresponding signal is shown. There is no sharp peak in the FFT spectrum of both pressure and global heat release rate fluctuations. The FFT spectrum shows a significant amplitude drop. After injecting secondary air jet, the amplitude has drastically reduced to 71.47 Pa. The amplitude difference before and after injecting secondary air jet. In the left y-axis, the R.M.S. of pressure (Pascal) is compared for with and without passive control is illustrated in FIG. 10C. Likewise, sound pressure level (decibel) in the right y-axis is also compared for these two cases. R.M.S. of pressure fluctuations (filled) and sound pressure level (horizontal patches) drops significantly after secondary injection, indicating around 89.16% suppression has happened in terms of PRMS (Pa). A difference of 20 decibels is seen after the secondary air jet injection.

Example 5A

Figure 11A:
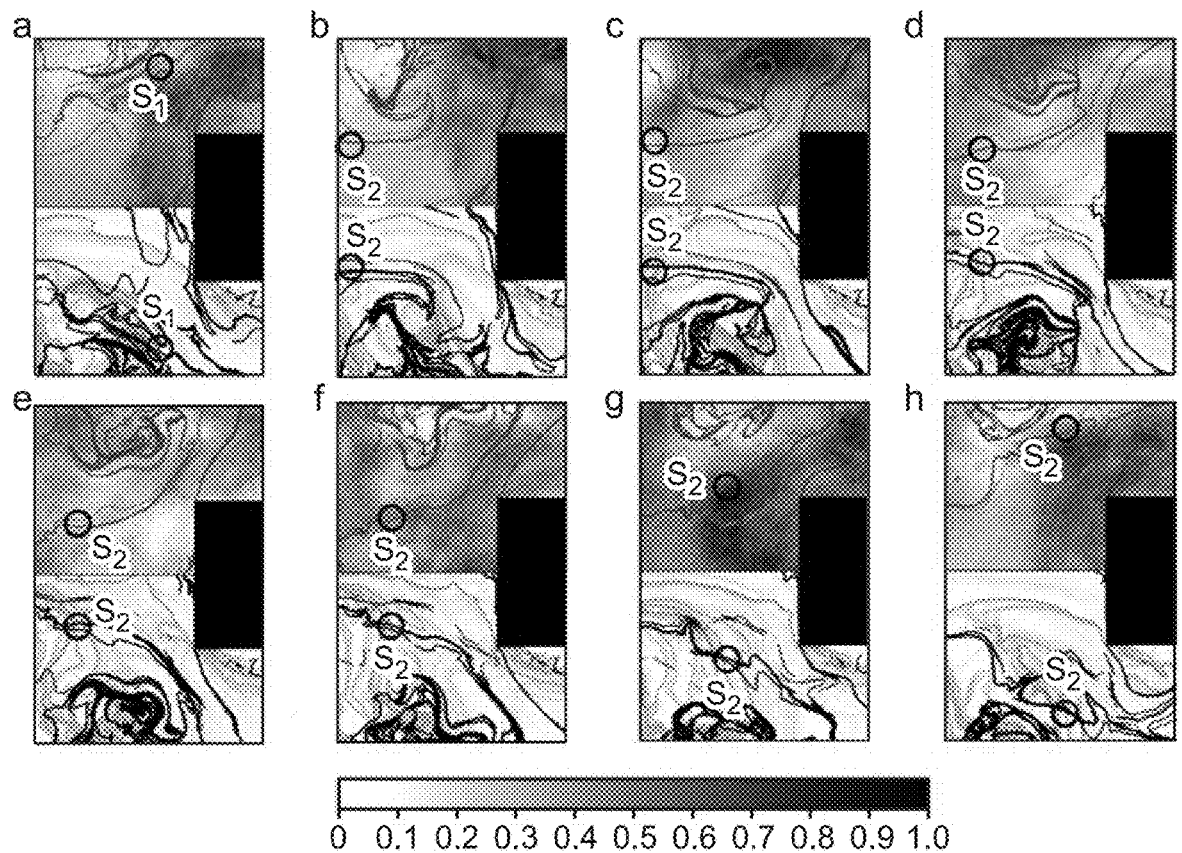
FIG. 11A illustrates FTLE field computation with CH* chemiluminescence in a time window in the thermoacoustic instability regime before injecting secondary air jet, according to an embodiment of the present subject matter.
Figure 11B:
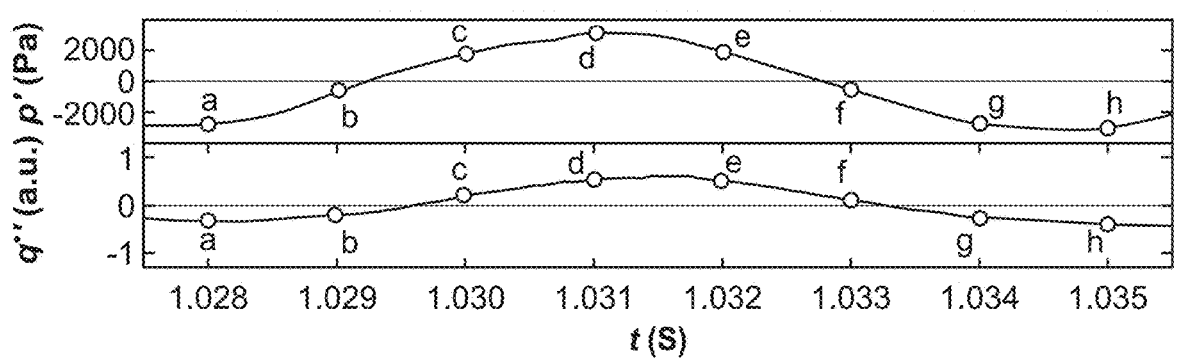
FIG. 11B illustrates pressure fluctuations and global heat release rate fluctuations corresponding to a time period in the thermoacoustic instability regime, according to one embodiment of the present subject matter.

FTLE Field Computation with CH* Chemiluminescence in a Time Window in the Thermoacoustic Instability Regime Before Injecting Secondary Air Jet Ridges of FTLE fields computed with the velocity data along with CH* chemiluminescence showing local heat release rate fluctuations over a time window in the thermoacoustic instability regime before injecting secondary air jet is illustrated in FIG. 11A. The top panels (a) to (d) show backward-time FTLE ridges along with CH* chemiluminescence. In bottom panels (d) to (h), the ridges of backward-time FTLE field (black contour lines) are overlaid on ridges of forward-time FTLE field (gray filled contour). The contour levels have been normalized with the maximum value of the FTLE field. Critical regions are marked using black circles S1 and S2 on both panels. Unsteady pressure fluctuations (p') and global heat release rate fluctuations (q') corresponding to a time period in the thermoacoustic instability regime are shown in FIG. 11B. Flow is from left to right. Since the shear layer flapping happens in the upstream of bluff-body, a zoomed in velocity field is obtained to compute high resolution FTLE fields.

Example 5B

Figure 12A:
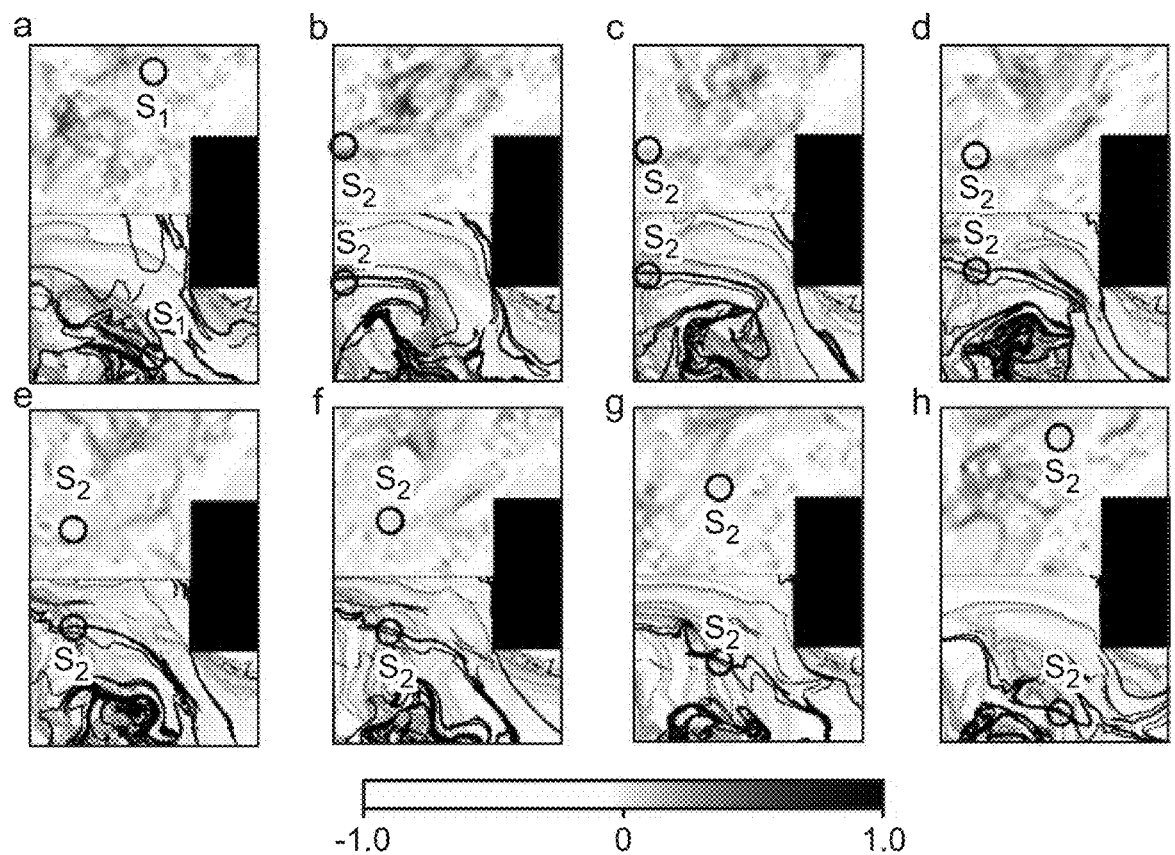
FIG. 12A illustrates FTLE field computation with vorticity plots in a time window in the thermoacoustic instability regime before injecting secondary air jet, according to one embodiment of the present subject matter.
Figure 12B:
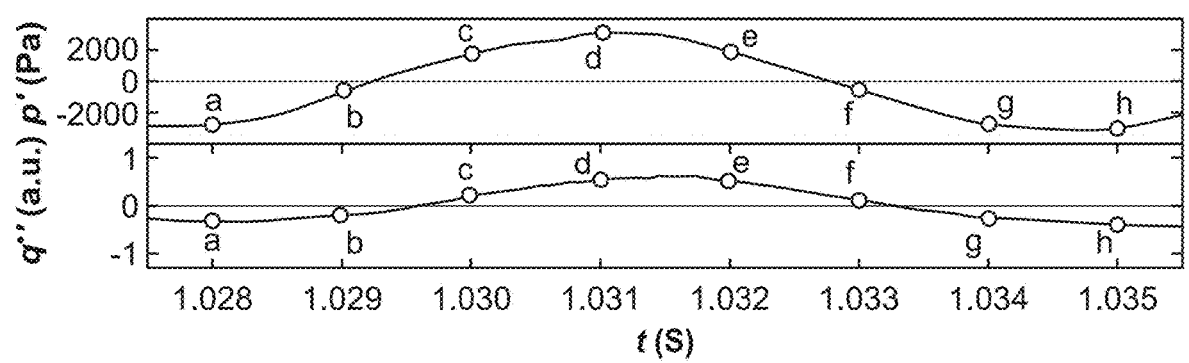
FIG. 12B illustrates pressure fluctuations and global heat release rate fluctuations corresponding to a time period in the thermoacoustic instability regime, according to one embodiment of the present subject matter.

FTLE Field Computation with Vorticity Plots in a Time Window in the Thermoacoustic Instability Regime Before Injecting Secondary Air Jet Ridges of FTLE fields computed with the velocity data along with vorticity plots over a time window in the thermoacoustic instability regime before injecting secondary air jet is illustrated in FIG. 12A. The top panels (a) to (d) show vorticity plots computed using the velocity data. In bottom panels (e) to (h), the ridges of backward time FTLE field (black contour lines) are overlaid on ridges of forward-time FTLE field (gray filled contour). Critical regions are marked using black circles S1 and S2 on both panels. Unsteady pressure fluctuations (p') and global heat release rate fluctuations (q') corresponding to a time period in the thermoacoustic instability regime are shown in FIG. 12B. Flow is from left to right.

Example 6A

Figure 13A:
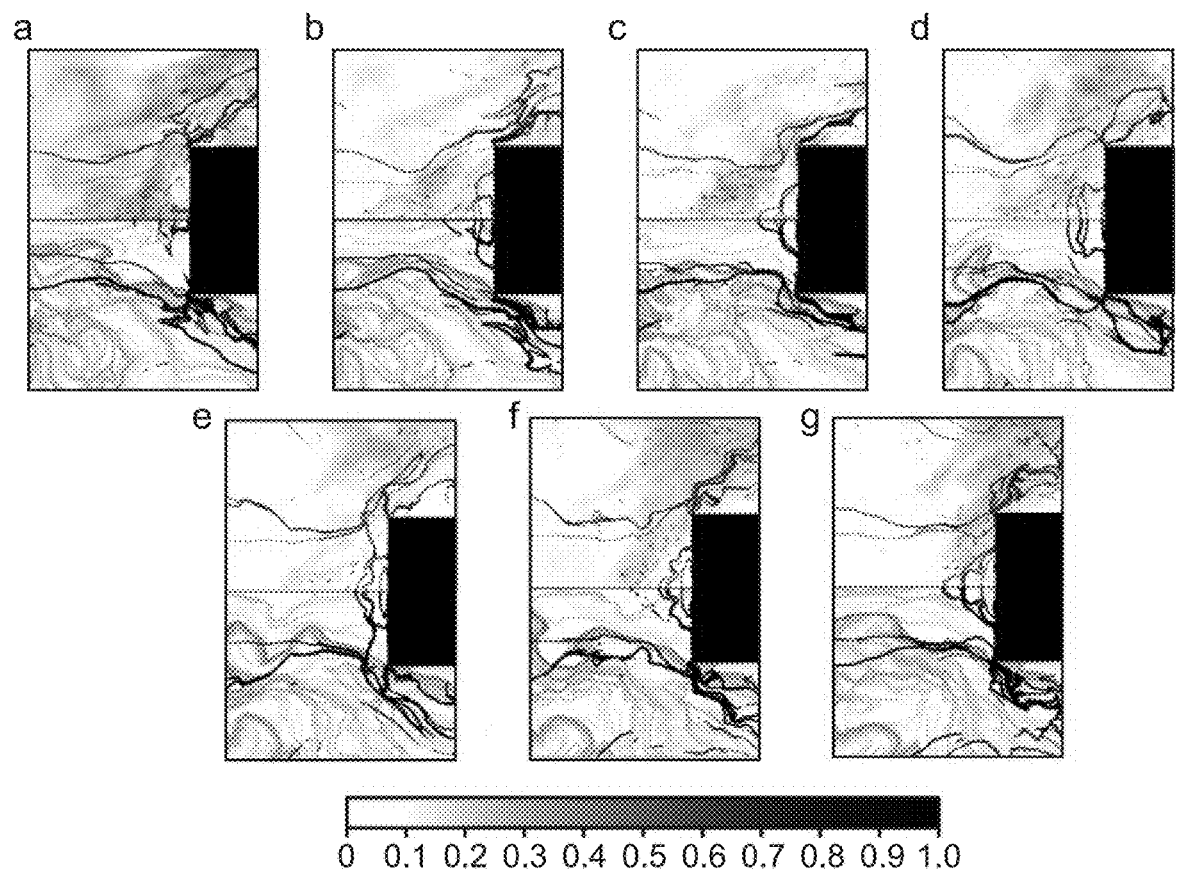
FIG. 13A illustrates FTLE field computation with CH* chemiluminescence in a time window in the thermoacoustic instability regime after injecting secondary air jet, according to an embodiment of the present subject matter.
Figure 13B:
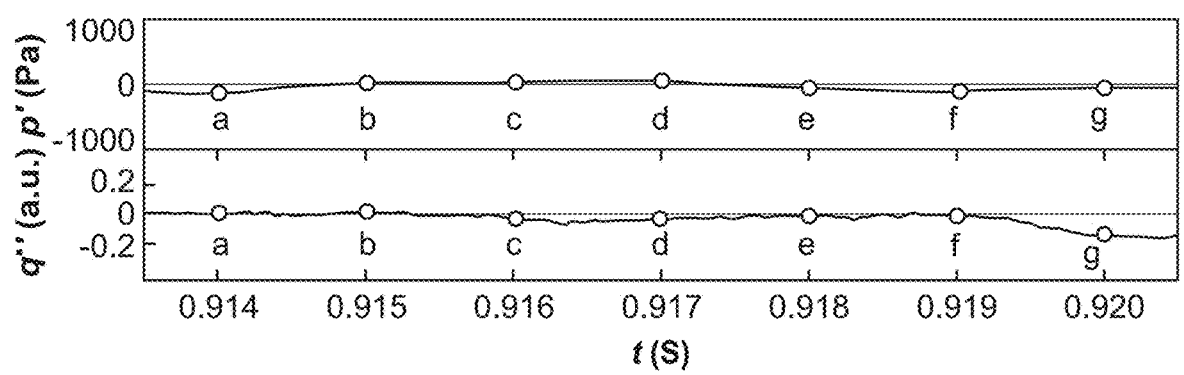
FIG. 13B illustrates pressure fluctuations and global heat release rate fluctuations corresponding to a time period in the thermoacoustic instability regime after secondary air injection, according to one embodiment of the present subject matter.

FTLE Field Computation with CH* Chemiluminescence in a Time Window in the Thermoacoustic Instability Regime after Injecting Secondary Air Jet Ridges of FTLE fields computed with the velocity data along with CH* chemiluminescence showing local heat release rate fluctuations over a time window in the thermoacoustic instability regime after injecting secondary air jet in the upstream of the bluff body is illustrated in FIG. 13A. The top panels (a) to (d) show backward-time FTLE ridges along with CH* chemiluminescence. In bottom panels (e) to (g), the ridges of backward-time FTLE field (black contour lines) are overlaid on ridges of forward-time FTLE field (gray filled contour). The contour levels have been normalized with the maximum value of the FTLE field. Unsteady pressure fluctuations (p') and global heat release rate fluctuations (q') corresponding to a time period in the thermoacoustic instability regime after secondary air jet injection is shown in FIG. 13B. Flow is from left to right. Upon secondary air jet injection in the upstream of the bluff-body, the periodicity in the upstream shear layer is disrupted. Thus, the amplitude of the tonal sound reduced drastically.

Example 6B

Figure 14A:
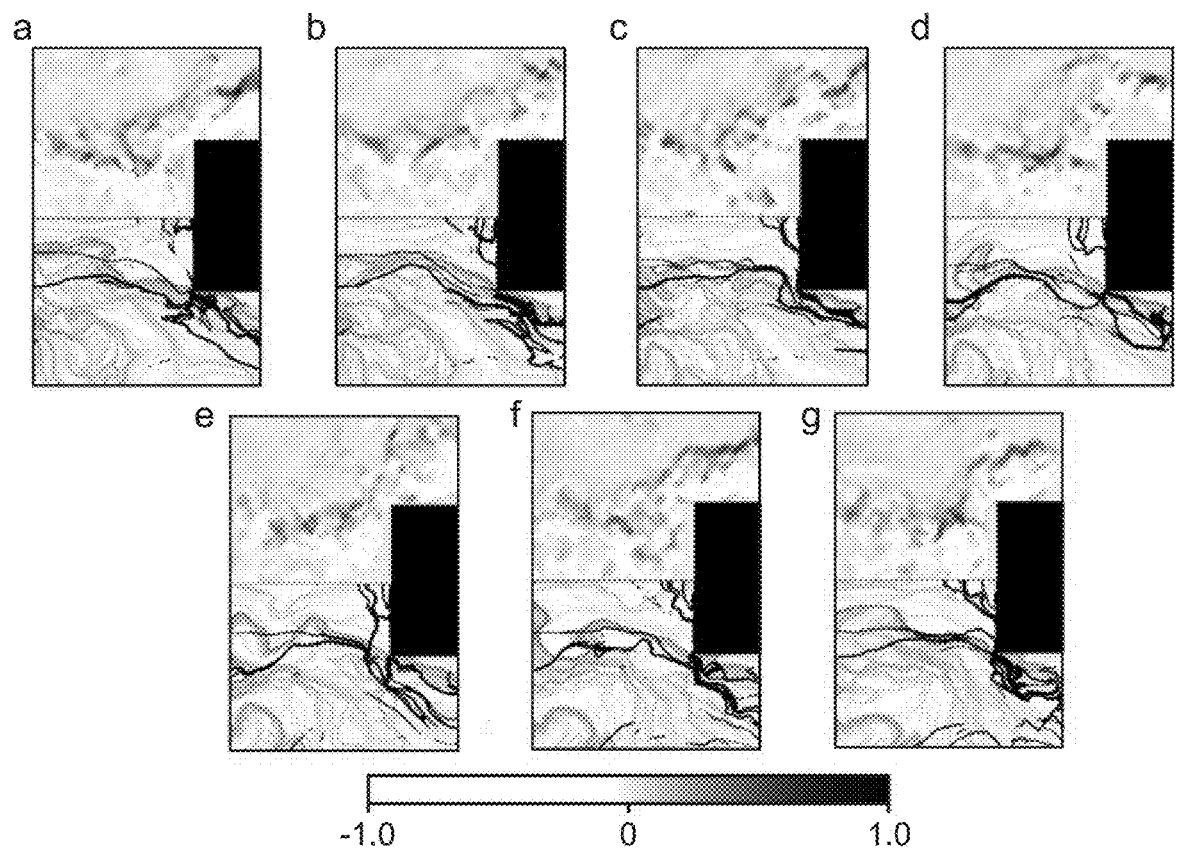
FIG. 14A illustrates FTLE field computation with CH* chemiluminescence in a time window in the thermoacoustic instability regime after injecting secondary air jet, according to one embodiment of the present subject matter.
Figure 14B:
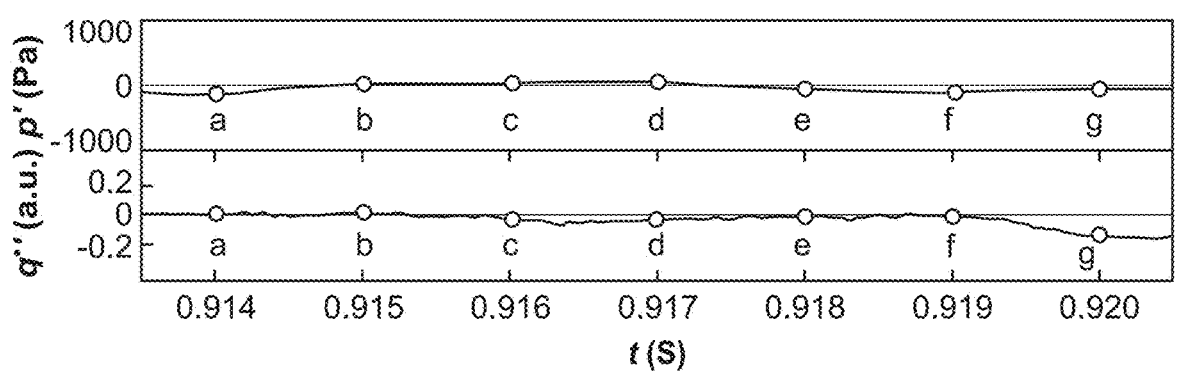
FIG. 14B illustrates pressure fluctuations and global heat release rate fluctuations corresponding to a time period in the thermoacoustic instability regime after secondary air injection, according to one embodiment of the present subject matter.

FTLE Field Computation with CH* Chemiluminescence in a Time Window in the Thermoacoustic Instability Regime After Injecting Secondary Air Jet Ridges of FTLE fields computed with the velocity data along with vorticity plots over a time window in the thermoacoustic instability regime after injecting secondary air jet in the upstream of the bluff body is illustrated in FIG. 14A. The top panels (a) to (d) show vorticity plots computed using the velocity data. In bottom panels (e) to (g), the ridges of backward-time FTLE field (black contour lines) are overlaid on ridges of forward-time FTLE field (gray filled contour). Unsteady pressure fluctuation (p') and global heat release rate fluctuation (q') corresponding to a time period in the thermoacoustic instability regime after secondary air jet injection is shown in FIG. 14B. Flow is from left to right.

Example 7A

Figure 15A:
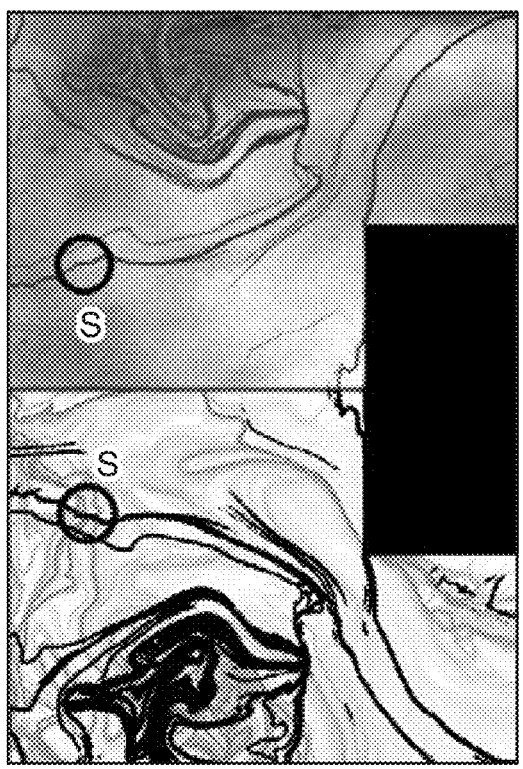
FIG. 15A illustrates FTLE field computation with CH* chemiluminescence in a time window in the thermoacoustic instability regime before injecting secondary air jet in the upstream of the bluff-body, according to an embodiment of the present subject matter.

FTLE Field Computation with CH* Chemiluminescence in a Time Window in the Thermoacoustic Instability Regime Before Injecting Secondary Air Jet in the Upstream of the Bluff-Body Ridges of FTLE fields computed with the velocity data along with CH* chemiluminescence showing local heat release rate fluctuations for a time instant in the thermoacoustic instability regime before injecting secondary air jet in the upstream of the bluff-body is illustrated in FIG. 15A. The top panels show backward-time FTLE ridges along with CH* chemiluminescence. In bottom panels, the ridges of backward-time FTLE field (black contour lines) are overlaid on ridges of forward-time FTLE field (gray filled contour). Critical regions S are marked using black circles on both panels. Flow is from left to right. Critical regions are advected along the shear layer where the periodic flapping is seen.

Example 7B

Figure 15B:
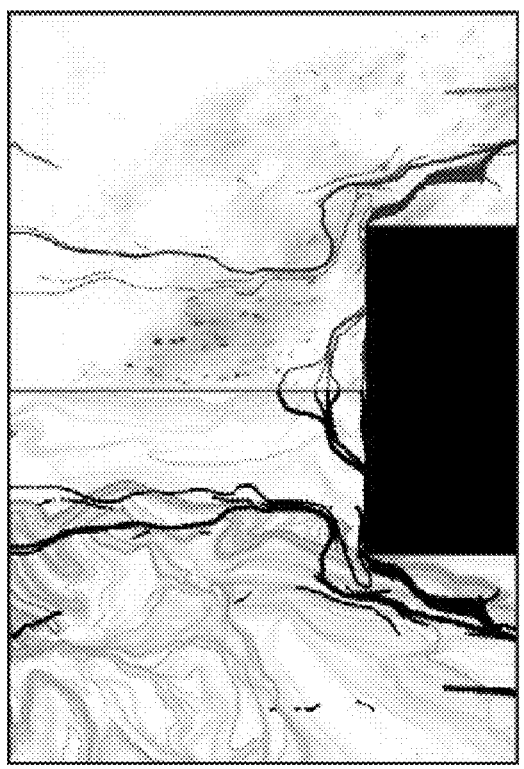
FIG. 15B illustrates FTLE field computation with CH* chemiluminescence in a time window in the thermoacoustic instability regime after injecting secondary air jet in the upstream of the bluff-body, according to another embodiment of the present subject matter.

FTLE Field Computation with CH* Chemiluminescence in a Time Window in the Thermoacoustic Instability Regime After Injecting Secondary Air Jet in the Upstream of the Bluff-Body Ridges of FTLE fields computed with the velocity data along with CH* chemiluminescence showing local heat release rate fluctuations for a time instant in the thermoacoustic instability regime after injecting secondary air jet in the upstream of the bluff-body is illustrated in FIG. 15B. The top panels show backward-time FTLE ridges along with CH* chemiluminescence. In bottom panels, the ridges of backward-time FTLE field (black contour lines) are overlaid on ridges of forward-time FTLE field (gray filled contour). Flow is from left to right. The periodicity of the upstream shear layer is disrupted to suppress the tonal sound.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes and variations which will be apparent to those skilled in the art may be made in the arrangement, operation and details of the system and method of the present invention disclosed herein without departing from the spirit and scope of the invention as described here.

What is claimed is:

1. A computer implemented method of controlling onset of oscillatory instabilities in a turbulent flow system, the method comprising:
    receiving data from one or more measuring devices connected to the turbulent flow system incorporating a control strategy in the flow field;
    determining one or more flow characteristics from the data obtained from the measuring devices;
    computing critical dynamics from backward time finite-time Lyapunov exponent (FTLE) fields based on the one or more flow characteristics;
    identifying one or more regions of critical dynamics associated with impending oscillatory instabilities in the turbulent flow system; and
    disrupting the identified region of critical dynamics to control the onset of oscillatory instabilities in the turbulent flow system.

2. The method as claimed in claim 1, wherein the data is received using Particle Image Velocimetry (PIV) technique or Computational Fluid Dynamics (CFD) methods comprising Direct Numerical Simulations (DNS) and Large Eddy Simulation (LES), and a photomultiplier tube and high speed cameras.

3. The method as claimed in claim 1, comprising performing signal conditioning processes on the data obtained from measuring device, wherein the signal conditioning processes comprises noise filtering and signal amplification.

4. The method as claimed in claim 1, wherein the flow characteristics comprises computation of a flow-map function indicative of the displacement of fluid parcels for one or more time intervals.

5. The method as claimed in claim 1, wherein identifying one or more critical regions comprises selecting one or more regions above a predetermined threshold value in the FTLE fields.

6. The method as claimed in claim 1, wherein the control strategy comprises an active control strategy in the flow field, the active control strategy comprising actuating a valve to control the flow velocity to control the onset of oscillatory instabilities in the turbulent flow system.

7. A system for controlling onset of oscillatory instabilities in a turbulent flow system, the system comprising:
    a memory unit;
    one or more measuring devices configured to measure data associated with turbulent flow system incorporating a control strategy in the flow field;
    a processor coupled to the memory unit, wherein the processor is configured to:
        receive data from one or more measuring devices connected to the turbulent flow system;
        determine one or more flow characteristics from the data obtained from the measuring devices;
        compute critical dynamics from backward time finite-time Lyapunov exponent (FTLE) fields based on the one or more flow characteristics; and
        identify one or more regions of critical dynamics associated with impending oscillatory instabilities in the turbulent flow system; and
    a passive control unit configured to disrupt the identified region of critical dynamics to control the onset of oscillatory instabilities in the turbulent flow system.

8. The system as claimed in claim 7, wherein one or more measuring devices comprise:
    a system to perform Particle Image Velocimetry (PIV), photo multiplier tube, and high speed cameras.

9. The system as claimed in claim 7, comprising: a control unit configured to receive the identified one or more critical regions and control the operation of an actuating device.

10. The system as claimed in claim 9, wherein the actuating device is configured to actuate a valve to control the flow velocity to control the onset of oscillatory instabilities in the turbulent flow system.

11. A computer program product having non-volatile memory therein, carrying computer executable instructions stored therein to control onset of oscillatory instabilities in a turbulent flow system, the instructions comprising:
    receiving data from one or more measuring devices connected to the turbulent flow system incorporating a control strategy in the flow field;
    determining one or more flow characteristics from the data obtained from the measuring devices;
    computing critical dynamics from backward time finite-time Lyapunov exponent (FTLE) fields based on the one or more flow characteristics;
    identifying one or more regions of critical dynamics associated with impending oscillatory instabilities in the turbulent flow system; and
    disrupting the identified region of critical dynamics to control the onset of oscillatory instabilities in the turbulent flow system.

* * * * *